United States Patent
Saito et al.

(10) Patent No.: US 6,931,957 B2
(45) Date of Patent: Aug. 23, 2005

(54) MODULE TO CONTROL A ROTATING OUTPUT SHAFT AND A MODULE TO CHANGE A DRIVING CONDITION OF A VEHICLE

(75) Inventors: Masashi Saito, Hitachinaka (JP); Youichi Nakano, Hitachinaka (JP); Hayato Sugawara, Hitachinaka (JP); Hiroaki Saeki, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 102 days.

(21) Appl. No.: 10/325,883

(22) Filed: Dec. 23, 2002

(65) Prior Publication Data
US 2003/0135314 A1 Jul. 17, 2003

(30) Foreign Application Priority Data
Dec. 21, 2001 (JP) ........................................ 2001-388685

(51) Int. Cl.[7] .............................................. F16H 59/00
(52) U.S. Cl. ........................................................ 74/335
(58) Field of Search .............................. 74/335; 180/247

(56) References Cited

U.S. PATENT DOCUMENTS

| 5,361,650 A | | 11/1994 | Klecker et al. |
| 6,116,391 A | | 9/2000 | Kremmling et al. |
| 6,155,126 A | * | 12/2000 | Vogt et al. ..................... 74/335 |
| 6,315,073 B1 | * | 11/2001 | Nonaka ...................... 180/247 |

FOREIGN PATENT DOCUMENTS

EP 0819869 1/1998

* cited by examiner

*Primary Examiner*—Dirk Wright
(74) *Attorney, Agent, or Firm*—Crowell & Moring LLP

(57) ABSTRACT

A sensor and a control circuit are provided externally of a gear cover. This enhances reliability of a shift controller operated by an electric actuator and a motor driven control module similar thereto, and constitute them compact. Further, this provides a rotating position detection sensor suitably used for a switching device as described. A circuit and a sensor are not contaminated with oil or metal powder of a gear mechanism portion.

7 Claims, 20 Drawing Sheets

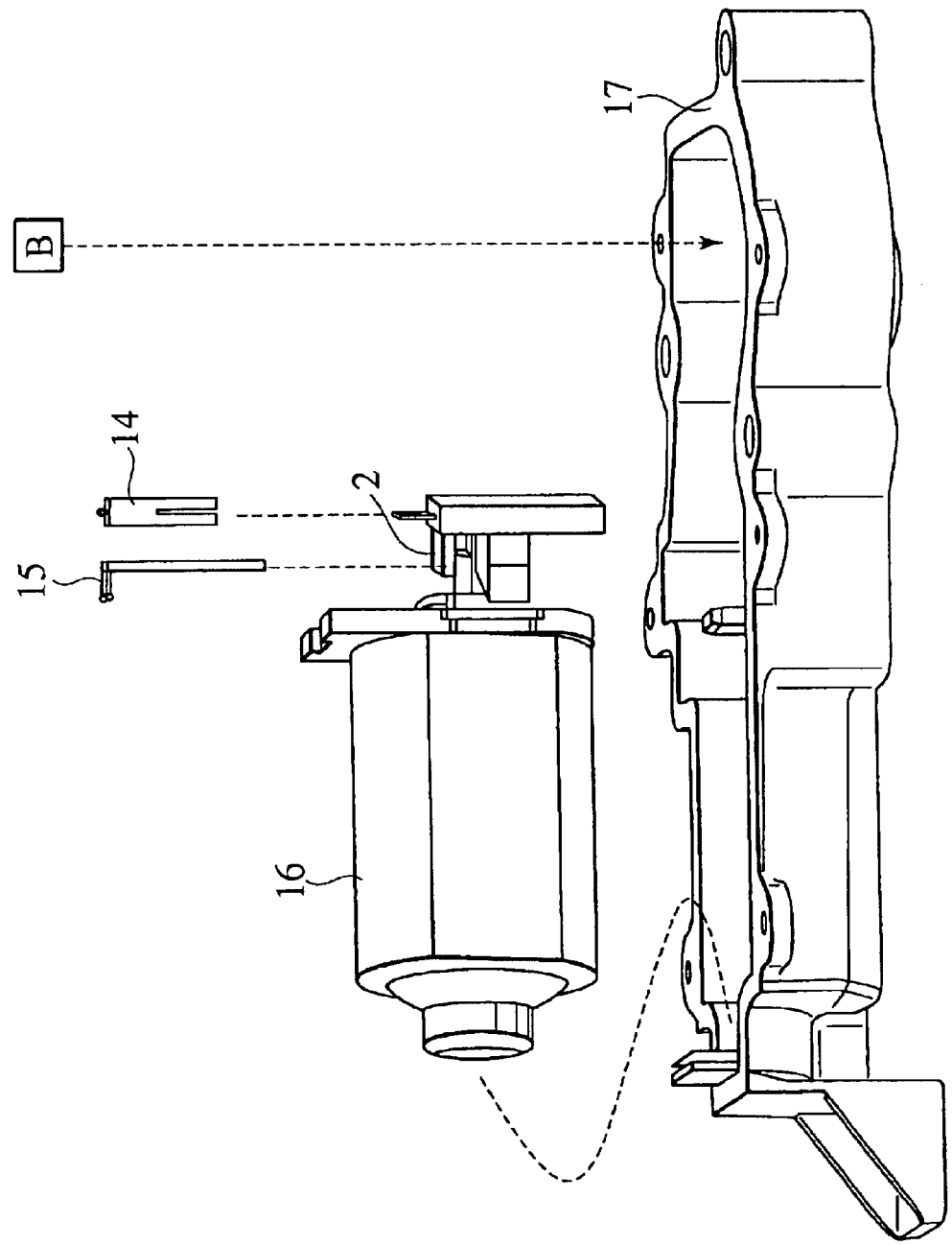

FIG.6
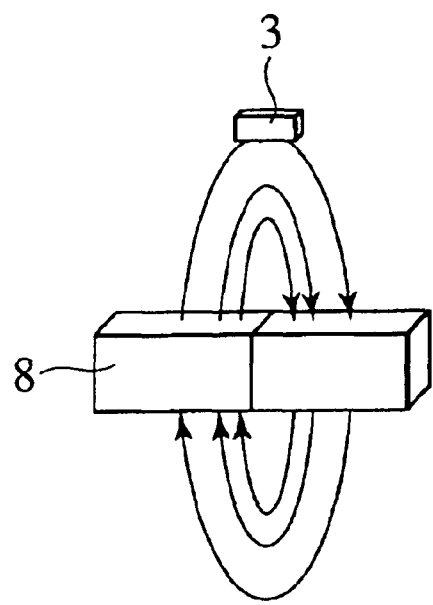
(a)
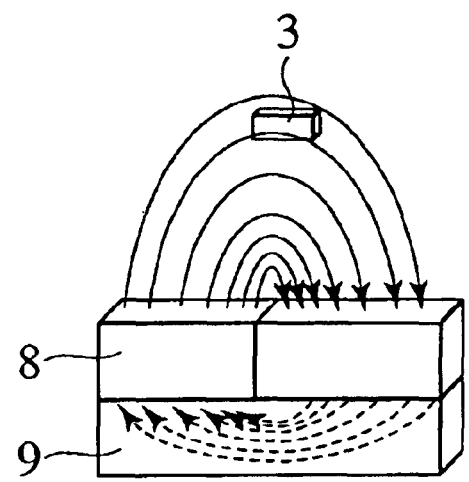
(b)

FIG.8
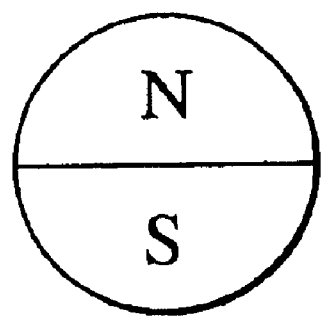
(a)
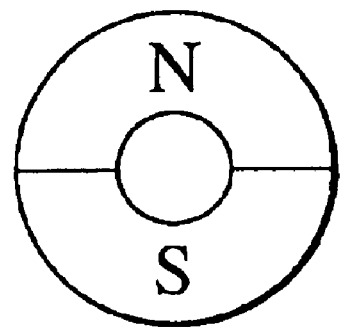
(b)
(c)
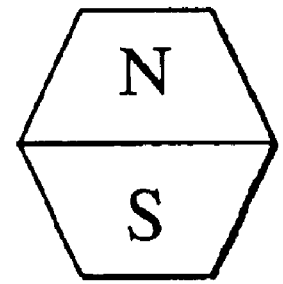
(d)

MODULE TO CONTROL A ROTATING OUTPUT SHAFT AND A MODULE TO CHANGE A DRIVING CONDITION OF A VEHICLE

BACKGROUND OF THE INVENTION

The present invention relates to a shift controller in a wide sense for switching two-wheel drive/four-wheel drive of a motor vehicle or for switching a transmission channel of the drive force as in a transmission, and particularly to a shift controller to be operated by an electric actuator. Further, it can be utilized also for a motor drive type control module similar to the former. Moreover, this is related also to a rotating position detection sensor used for such a switching device as described.

In conventional devices, a shift controller described in U.S. Pat. No. 6,155,126 has a gear arranged capable of transmitting torque between a motor and a shift rail as an output member, and comprises a housing for receiving a motor and a gear mechanism, and a cover, wherein a control circuit board including a microcomputer is mounted on the inner surface of the cover, and the control circuit board is formed with a plurality of rotation detectors and its processing circuit.

Further, there has been known, as described in Japanese Patent Laid-Open No. 94512/1999, an angle sensor in which a magnet is mounted on a rotational body, and a change in magnetic field of a magnet depending on the position of the rotation angle is measured by a magnetic sensor element, the sensor comprising a measuring element for determining a direction signal depending on the direction of magnetic field crossing the measuring element, and an evaluation circuit for determining an angle position from an output signal of the magnetic sensor element and an output signal of the direction measuring element.

Further, there has been known a method for computing an angle using a threshold calculated by a pre-stored reference table and calibration as described in SAE2001-01-0984 as a processing technique of a rotating position signal.

The aforementioned conventional techniques pose a problem that since the control circuit board is exposed into the gear receiving chamber, the control circuit is erroneously operated due to dust, oil and iron powder generated in the gear receiving chamber.

The aforementioned conventional techniques pose a problem that since the rotational body and the rotation angle sensor or the signal processing circuit of the sensor are exposed to the gear receiving chamber, the rotation angle sensor or the signal processing circuit is erroneously operated due to dust, oil and iron powder generated in the rotational body.

In the aforementioned conventional techniques, to detect a rotation angle over 360 degrees of an output rotating shaft, a first sensor mechanism for detecting a rotational direction and a rotation angle of a motor, and a second sensor mechanism for detecting an angle position of the output rotating shaft are necessary, and the sensor mechanisms were complicated. Further, there poses a problem that the resolution of the senor is affected by a gear ratio.

The aforementioned conventional techniques pose a problem that since a sensor output signal is a pulse, only the dispersal angle detection can be done.

The aforementioned conventional techniques pose a problem that since a Hole element is used, it is necessary to keep the distance between a rotational body and a sensor element within 3 mm, thus posing a problem that management of distance between the hole element and the rotational body is severe.

In the aforementioned conventional techniques, a magnet is mounted directly on a rotational body, and to excite an angle sensor, it is necessary to increase the magnetic force of a magnet or to make the distance between the magnet and the sensor narrow, thus posing a problem with cost of the magnet and assembling property.

In the aforementioned conventional techniques, to secure the transmission mechanism, it is necessary to apply counterbore milling processing to the cover on which a gear cover and a board are mounted. Because of this, there poses a problem that the shape of the control circuit board is subjected to restriction conditions.

In the aforementioned conventional techniques, a gear is constituted merely by a spur gear, and when a motor is installed or at the time of backlash, an excessively large load is applied to the gear, thus posing a problem that the gear is broken.

In the aforementioned conventional techniques, since a motor and a control circuit board are connected through a conductor, there poses a problem that when an excessive tensile stress is exerted between the motor and the control circuit board, the conductor is broken. Further, workability of the connection work was poor.

In the aforementioned conventional techniques, radiation of the control circuit board is not taken into consideration, thus posing a problem that heat generated in the control circuit board is not radiated from the control circuit board, and at high temperature, the control circuit is erroneously operated.

In the aforementioned conventional techniques, a circuit board receiving case (hereinafter called a board case) constituted from a housing and a cover is of a closed construction, thus posing a problem that when the board case is contracted or expanded, excessive stress is applied to the control circuit board or the board case, and the control circuit board or the board case is broken.

In the aforementioned conventional techniques, a positional relation between the rotational center axis of the magnet and the sensor is deviated, and a change in magnetic flux crossing the sensor is not a point symmetry, posing a problem that a sensor output is different every product.

In the aforementioned conventional techniques, there poses a problem that the sensor output is affected by the peripheral temperature of the sensor, and accordingly, the resolution is deteriorated due to the change in temperature.

In the aforementioned conventional techniques, there poses a problem that where an angle is measured over 360 degrees, since a first Hole element and a second Hole element are necessary in addition to an MR sensor, the sensor mechanism is complicated.

In the aforementioned conventional techniques, there poses a problem that in order to keep the distance between centers of the gears, a gear case (housing) and a board case (cover) are provided with counterbores, and the distance between the gears is varied due to the assembling tolerance or processing tolerance.

SUMMARY OF THE INVENTION

To achieve the object of the present invention, the constitution of the present invention is as follows:

<1>

In a module comprising a motor for driving a shift rail of a transfer case, a control circuit of said motor, and a gear mechanism for transmitting rotation of said motor to said shift rail, the control device changes the driving condition of a vehicle in which the gear mechanism is enclosed by a cover attached externally.

<2>

In a module to change a driving condition of a vehicle, the module has a shift module comprising a shift rail of a transfer case driven by a motor vehicle, a gear mechanism for transmitting rotation of the motor to the shift rail, a non-contact type magnetic sensor for detecting a rotating position of said shift rail, wherein the magnetic sensor comprises a magnet rotated together with the shift rail, and a GMR element for measuring the magnetic field which changes according to the rotating position of the magnet, and the GMR element is attached at a position facing to the magnet, externally of a cover for enclosing the gear mechanism.

<3>

In the module to change a driving condition of a vehicle according to item 2, the cover also serves as a board on which the control circuit is mounted, and the GMR element is mounted on the board together with the control circuit.

<4>

In the module to change a driving condition of a vehicle according to item 2, the magnetometric sensor detects a rotating position of 360 degrees of the shift rail.

<5>

A module to change a driving condition of a vehicle comprising a motor for driving a shift rail of a transfer case, a gear mechanism for transmitting rotation of the motor to the shift rail, a metal case for receiving the motor and the gear mechanism, and a resin cover for covering the motor and the gear mechanism covered by the metal case.

<6>

In the module to change a driving condition of a vehicle according to item 5, a control circuit board for driving the motor is attached externally of the resin cover, and the motor is electrically connected to the control circuit by electric wiring which extends through the resin cover.

<7>

In a module for transmitting the turning force from a rotating shaft of a motor to an output rotating shaft through a reduction gear, the output rotating shaft and the rotating shaft of a motor are arranged in a mutually crossing positional relation. There is provided a housing formed with a recess for receiving the gear mechanism including the output rotating shaft and the motor laterally arranged. The control device comprises a cover member for forming a chamber for receiving the gear mechanism including the output rotating shaft and the motor laterally arranged in cooperation with the recess mounted in the housing and formed in the housing, and a control circuit portion of the motor is mounted externally of the cover member. An electric conductor portion made of conductive rigid body which is bended into an L-shape is provided between a power feed terminal of the motor and a connection terminal of the control circuit portion.

<8>

In the module according to item 7, the electric conductor portion made of conductive rigid body which is bended into an L-shape is formed on a feed terminal of the motor.

<9>

In the module according to item 7, the electric conductor portion made of conductive rigid body which is bended into an L-shape is formed on an intermediate terminal mounted between the feed terminal of the motor and the connection terminal of the control circuit portion.

<10>

In the module according to item 7, the electric conductor portion made of conductive rigid body which is bended into an L-shape is formed from the feed terminal of the motor and the connection terminal of the control circuit portion.

<11>

A module to control a position of an output rotating shaft comprises: a motor for drivingly rotating an output rotating shaft to a fixed position through a gear mechanism; a control circuit of the motor; a housing for holding the output rotating shaft and the rotating shaft of the motor in such a manner that both of them are perpendicular to each other; an intermediate gear mechanism provided between a gear formed on a rotating shaft end of the motor and a gear formed on the output rotating shaft to transmit torque of the motor to the output rotating shaft; a cover member defining a space for receiving an extreme end of the output rotating shaft, the intermediate gear and the motor in cooperation with the housing; a magnet mounted on the extreme end of the output rotating shaft; a magnetic sensor element mounted at a position facing to the magnet externally of the cover member; the control circuit including a processing circuit for processing an output signal from the magnetic sensor element to detect a rotating position of the output rotating shaft, electrically connected to the motor by an electric conductor extending through the cover member, and arranged externally of the cover member; and a connector portion formed on the cover member to receive a desired position signal of the output rotating shaft in the control circuit.

<12>

In a non-contact rotation sensor for detecting a rotating position of a rotating shaft, a cover member made of resin for enclosing an end of the rotating shaft is provided, a magnet is mounted on the end of the rotating shaft, and a magnetic sensor element is mounted at a position facing to the magnet externally of the cover member.

<13>

In the non-contact rotation sensor according to item 12, a control circuit including a circuit device for processing an output signal from the magnetic sensor element is connected to the outer surface of the cover member made of resin directly or through the board.

<14>

In the non-contact rotation sensor according to item 12, a control circuit including a circuit device for processing an output signal from the magnetic sensor element is connected to the outer surface of the cover member made of resin through the board, and the magnetic sensor element is mounted on the board.

<15>

In the non-contact rotation sensor according to item 12, a control circuit including a circuit device for processing an output signal from the magnetic sensor element is connected to the outer surface of the cover member made of resin through the board, the magnetic sensor element is mounted on the board, and a radiating member is put between the board and the cover member.

<16>

In the non-contact rotation sensor according to item 12, the radiating member is made of nonmagnetic steel.

<17>

In the non-contact rotation sensor according to any one of items 12 to 16, the magnetometric sensor element is an MR element.

<18>

In the non-contact rotation sensor according to any one of items 12 to 16, the magnetometric sensor element is a GMR element.

<19>

In a module to change a driving condition of a vehicle comprises a receiving casing for receiving a motor for rotating and driving a shift rail of a transfer case and a gear mechanism for transmitting rotation of the motor to the shift rail, a control circuit of the motor is mounted on the outer circumference of the receiving casing, and having a cover member for forming a closed space for receiving the control circuit, and the closed space is communicated with open air through a drain hole or a ventilation hole.

<20>

In the module to change a driving condition of a vehicle according to item 19, the drain hole or the ventilation hole is bored on the side to be the ground side with the receiving casing mounted on the motor vehicle.

<21>

In a control device for switching the drive state of a motor vehicle comprising a receiving casing for receiving a motor for rotating and driving a shift rail of a transfer case and a gear mechanism for transmitting rotation of the motor to the shift rail, a control circuit of the motor is mounted on the outer circumference of the receiving casing, and providing a cover member for forming a closed space for receiving the control circuit.

<22>

In a module to change a driving condition of a vehicle comprising a casing having a receiving recess for receiving a motor for rotating and driving a shift rail of a transfer case and a gear mechanism for transmitting rotation of the motor to the shift rail, an opening of the receiving recess of the casing is blocked by a cover member having a space in which the control circuit of the motor is closed and received.

<23>

In a module to change a driving condition of a vehicle comprising a receiving casing for receiving a motor for drivingly rotating a shift rail of a transfer case and a gear mechanism for transmitting rotation of the motor to the shift rail, a control circuit of the motor being mounted integral with the receiving casing, on the control circuit of the motor are arranged a sensor for detecting a rotating position of the shift rail; an amplifier for amplifying a signal of the sensor; a signal terminal for receiving a desired position signal of the shift rail; an output terminal for supplying power to the motor; a motor drive circuit connected to the output terminal to control a power supply to the motor; and a microcomputer for outputting a control signal to the motor drive circuit on the basis of a signal received by the signal terminal and a signal from the sensor.

<24>

In the module to change a driving condition of a vehicle according to item 23, the control circuit of the motor further comprises a lamp drive circuit for receiving a command signal from the microcomputer to control of feed to a lamp indicative of a control position of the shift rail, and a lamp signal output terminal for outputting an output signal from the lamp drive circuit to outside.

<25>

In the module to change a driving condition of a vehicle according to item 23, the control circuit of the motor further comprises a lamp drive circuit for receiving a command signal from the microcomputer to control power supply to a lamp indicative of a control position of the shift rail, and a lamp signal output terminal for outputting an output signal from the lamp drive circuit to outside.

<26>

In a module to change a driving condition of a vehicle comprising a receiving casing for receiving a motor for rotating and driving a shift rail of a transfer case and a gear mechanism for transmitting rotation of the motor to the shift rail, a control circuit of the motor being mounted integral with the receiving casing, on the control circuit of the motor are arranged a sensor for detecting a rotating position of the shift rail, an amplifier for amplifying a signal of the sensor, a signal terminal for receiving a desired position signal of the shift rail, an output terminal for supplying power to the motor, a motor drive circuit connected to the output terminal to control a power supply to the motor, and a microcomputer for outputting a control signal to the motor drive circuit on the basis of a signal received by the signal terminal and a signal from the sensor. The case is integrally formed with two connectors; one of the two connectors is provided with a command input terminal to which the signal terminal is connected, a power terminal and an earth terminal; the other is provided with a motor power supply terminal to which the output terminal is connected.

<27>

In the module to change a driving condition of a vehicle according to item 26, the control circuit of the motor further comprises a lamp drive circuit for receiving a command signal from the microcomputer to control power supply to a lamp indicative of a control position of the shift rail, a lamp signal output terminal for outputting an output signal from the lamp drive circuit to outside, and the one of the two connectors is further provided with a lamp signal terminal to which the lamp signal output terminal is connected.

<28>

In the module to change a driving condition of a vehicle according to item 23 or 26, the drive circuit is installed between the microcomputer and the terminal, and the sensor is installed close to the microcomputer away from the drive circuit.

<29>

A rotation detector comprises a magnet mounted on a rotational body, and a detection element for detecting a change in magnetic field of the magnet which changes according to a rotating position of the rotational body, wherein a magnetic material is provided between the rotational body and the magnet.

<30>

A rotation detector comprises a magnet mounted on a rotational body, a detection element for detecting a change in magnetic field of the magnet which changes according to a rotating position of the rotational body, and a processing circuit for signal processing an output of the detection element to detect a rotating position of 360 degrees of the rotational body, wherein the detection element outputs two sinusoidal wave signals which are different in phase, and the processing circuit synthesizes signal changes of four 90-degrees sections which are uniform in signal change with respect to rotation of the two sinusoidal wave signals to detect a rotating position of 360 degrees.

<31>

A shift controller to change a driving condition of a vehicle comprises an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, a sensor for detecting a rotation angle of the output member, and a control circuit board including a control circuit of the motor, wherein the control circuit board and a gear receiving portion are isolated by a partitioning wall mounted on the control circuit board.

<32>

In the shift controller to change a driving condition of a vehicle according to item 31, a magnet is arranged so as to rotate in synchronism with the output member, an MR element which is a sensor element which reacts in the direction of magnetic field is arranged on the control circuit board, and a processing circuit for signal processing an output signal of the MR element is provided on the control circuit board.

<33>

In the shift controller to change a driving condition of a vehicle according to item 32, the MR element is a GMR element.

<34>

In the shift controller to change a driving condition of a vehicle according to item 32 or 33, there is provided a processing function (arithmetic algorithm) for linearizing the output of the sensor element for each specific region, connecting the respective regions, and continuously detecting the rotation angle of the rotational body over 360 degrees

<35>

In the shift controller to change a driving condition of a vehicle according to item 32 or 33, a radiating plate which is a non-magnetic body is provided for radiation of the control circuit board.

<36>

In the shift controller to change a driving condition of a vehicle according to item 32 or 33, a yoke member made of magnetic material is arranged at a position in contact with the magnet and at a position opposite the sensor element.

<37>

In the shift controller to change a driving condition of a vehicle according to item 32 or 33, there is provided a sensor mechanism for canceling by calibration a difference between parts of the sensor element output for each product.

<38>

In the shift controller to change a driving condition of a vehicle according to item 32 or 33, there is provided a function of processing the sensor element output and a temperature sensor output arranged on the control circuit board by the control circuit, and compensating the sensor element output for the temperature characteristic thereof.

<39>

In a shift controller to change a driving condition of a vehicle, having an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, and a control circuit board including a control circuit of the motor, a magnet rotated in synchronism with the output member is provided, and a MR element which is a sensor element which reacts in the direction of magnetic field is arranged on the control circuit board and within the magnetism distribution of the magnet.

<40>

In the shift controller to change a driving condition of a vehicle according to item 39, the MR element is a GMR reactive in the direction of magnetic field.

<41>

In the shift controller to change a driving condition of a vehicle according to item 39 or 40, there is provided a processing function (arithmetic algorithm) of linearizing the output of the sensor element for each specific region, connecting the respective regions, and continuously detecting the rotation angle of the rotational body over 360 degrees.

<42>

In the shift controller to change a driving condition of a vehicle according to item 39 or 40, a radiating plate which is a non-magnetic body is provided for radiation of the control circuit board.

<43>

In the shift controller to change a driving condition of a vehicle according to 39 or 40, a yoke member made of magnetic material is arranged at a position in contact with the magnet and at a position opposite to the sensor element.

<44>

In the shift controller to change a driving condition of a vehicle according to item 39 or 40, there is provided a function of canceling a difference between parts of the sensor element output for each product.

<45>

In the shift controller to change a driving condition of a vehicle according to 39 or 40, there is provided a function of processing the sensor element output and the temperature sensor output arranged on the control circuit board by the control circuit, and compensating the sensor element output for the temperature characteristic thereof.

<46>

In a shift controller to change a driving condition of a vehicle, having an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, a sensor for detecting a rotation angle of the output member, a control circuit board formed with a processing circuit having a signal processing function of the sensor, a board case on which the circuit board is mounted, and a construction for covering the gear by the gear case and the board case, a worm gear is included in the constitutional elements of the gear, and the rotating shaft of the output member and the rotating shaft of the motor are positioned vertically each other.

<47>

In a shift controller to change a driving condition of a vehicle, having an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, a sensor for detecting a rotation angle of the output member, and a control circuit board including the control circuit of the motor, there is provided a construction in which a plurality of gears are meshed and connected through a gear holder.

<48>

In a shift controller to change a driving condition of a vehicle, having an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, a sensor for detecting a rotation angle of the output member, and a control circuit board including the control circuit of the motor, a terminal of the motor is connected to a terminal of the control circuit board by fitting connection.

<49>

In a shift controller to change a driving condition of a vehicle, having an output member for applying an operating force to a device for switching a drive force transmission channel to wheels of a motor vehicle, a motor for generating the drive force for rotating the output member, a gear for transmitting the drive force of the motor to the output member, a gear case in which the motor, the gear and the output member are received, a sensor for detecting a rotation angle of the output member, and a control circuit board including the control circuit of the motor, a board case for receiving the control circuit board or a cover joined to the board case is provided with a ventilation hole.

<50>

A non-contact magnetometric rotation angle sensor is constituted by a magnet mounted on a rotational body, an MR element positioned within a magnetism distribution space of the magnet and reactive in the direction of magnetic field, and a signal processing circuit board having a processing circuit for approximating an output signal of the MR element every specific region with respect to a rotation angle of the rotational body with a multi function, uniting divided regions and outputting a signal linearized over 360 degrees.

<51>

In the non-contact magnetometric rotation angle sensor according to item 49, the MR element is a GMR element which is reactive in the direction of magnetic field.

<52>

In the non-contact magnetometric rotation angle sensor according to item 49 or 50, the multi function is calculated by calibration.

<53>

In the non-contact magnetometric rotation angle sensor according to item 49 or 50, there is provided a holding plate which is non-magnetic body for holding the signal processing circuit board.

<54>

In the non-contact magnetometric rotation angle sensor according to item 49 or 50, a yoke member made of magnetic material is arranged at a position in contact with the magnet and at a position opposite the sensor element.

<55>

In the non-contact magnetometric rotation angle sensor according to item 49 or 50, there is provided a function in which the sensor element output and an output of a temperature sensor arranged on the signal processing circuit board are processed by the signal processing circuit, and the sensor element output is compensated for the temperature characteristic thereof.

<56>

In the non-contact magnetometric rotation angle sensor according to item 49 or 50, wherein the rotational body and the sensor element are isolated by a non-magnetic body.

BRIEF DESCRIPTION OF THE DRAWINGS

Other objects and advantages of the invention will become apparent from the following description of embodiments with reference to the accompanying drawings in which:

FIG. 4A is an exploded perspective view on the housing side of the shift controller according to one embodiment of the present invention;

FIG. 6 is an explanatory view of the principle of the rotation detection device according to one embodiment of the present invention;

FIG. 8 is an explanatory view showing examples (a)–(d) of magnets used for the rotation detection device according to one embodiment of the present invention;

DETAILED DESCRIPTION OF THE PREFERRED EMBODIMENTS

One embodiment will be described hereinafter on the basis of an example applied to a two-wheel drive/four-wheel drive switching shift controller.

<Four-wheel Drive>

Figure 1:
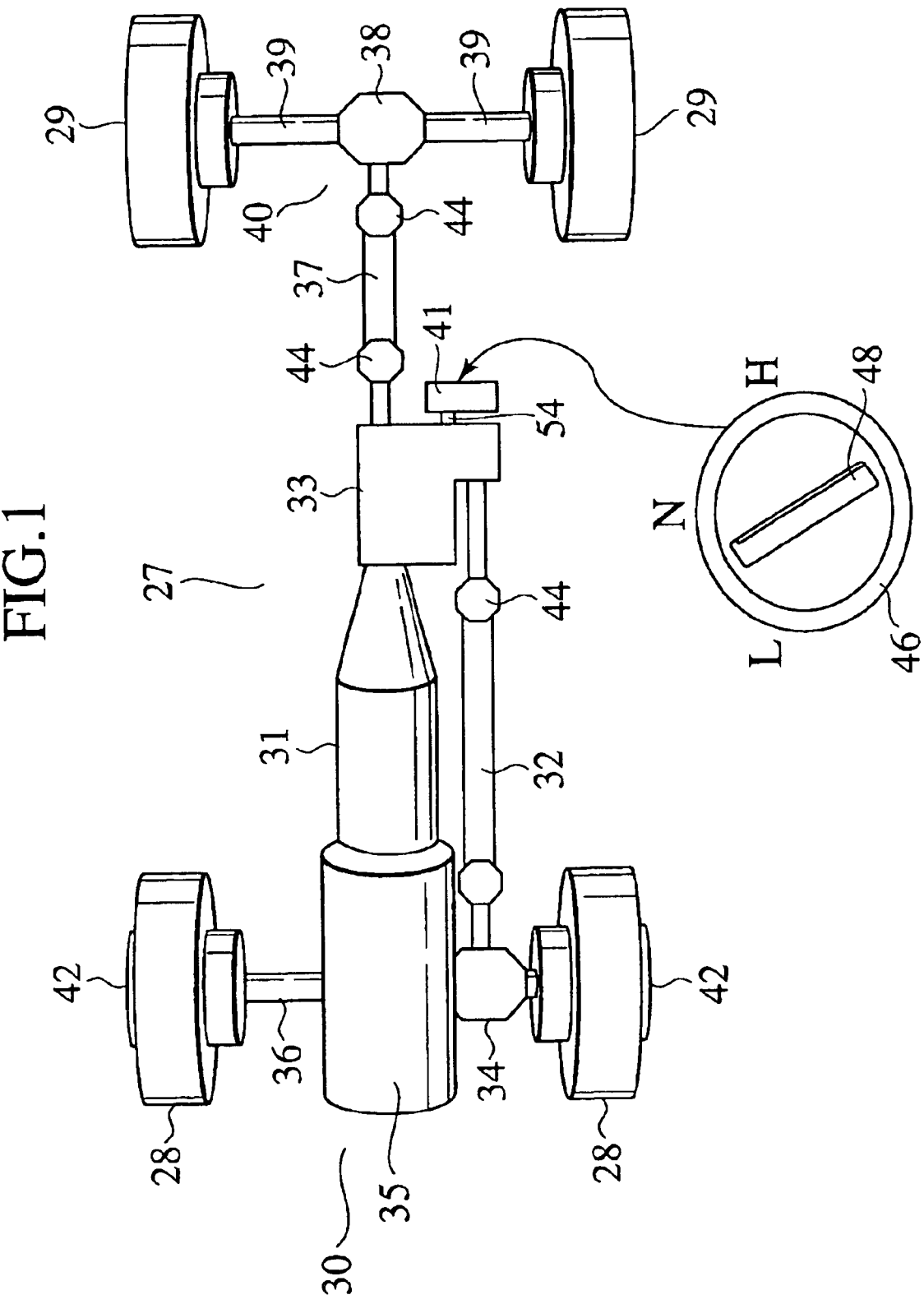
FIG. 1 is an entire constitutional view of a motor vehicle for which a shift controller is used according to one embodiment of the present invention.

First, referring to FIG. 1, a four-wheel vehicle drive train is schematically shown by reference numeral 27. The four-wheel vehicle drive train 27 includes an electric motor or prime mover 35 which is coupled to and directly drives a transmission 31. The transmission 31 may be either automatic or manual type. The output of the transmission 31 directly drives a transfer case assembly 33 which provides motive power to a primary or rear drive line 40 comprising a primary or rear prop shaft 37, a primary or rear differential 38, a pair of live primary or rear axles 39, and a respective pair of primary or rear tire and wheel assemblies. The transfer case assembly 33 selectively provides motive power to a secondary or front drive line 30 comprising a secondary or front prop shaft 32, a secondary or front differential assembly 34, a pair of live secondary or front axles, and a respective pair of secondary or front tire and wheel assemblies 28. The front tire and wheel assemblies 28 may be directly coupled to a respective one of the pair of secondary or front tire and wheel assemblies 28. Alternatively, a pair of manually or remotely activable locking hubs 42 may be operably disposed between the pair of front axles 36 and a respective one of the tire and wheel assemblies 28 to selectively connect same. Both the primary drive line 40 and the secondary drive line 30 may include suitable and appropriately universal joints 44 which function to allow static and dynamic offsets and misalignments between various shafts and components.

<Mode Switching Switch>

A control console or assembly 46 which is preferably disposed within convenient reach of the vehicle operator includes a switch 48 which facilitate selection of the operating mode of the transfer case assembly 33.

<Control Module for a Shift Controller>

A mechanical-electrical integrated type shift controller bearing control of a shift rail 54 of the transfer case assembly 33 is called a shift controller 41. The shift controller 41 is mounted on the transfer case assembly 33. The shift controller 41 has an output shaft bored with a counterbore, and is connected to the shift rail 54 of the transfer case assembly 33 through the output shaft. The shift controller 41 receives an output signal of the mode switching switch 44, vehicle speed information from the engine control unit, engine rotation frequency information, throttle position information, and has a function of causing the output shaft to follow the target rotation angle.

Figure 2:
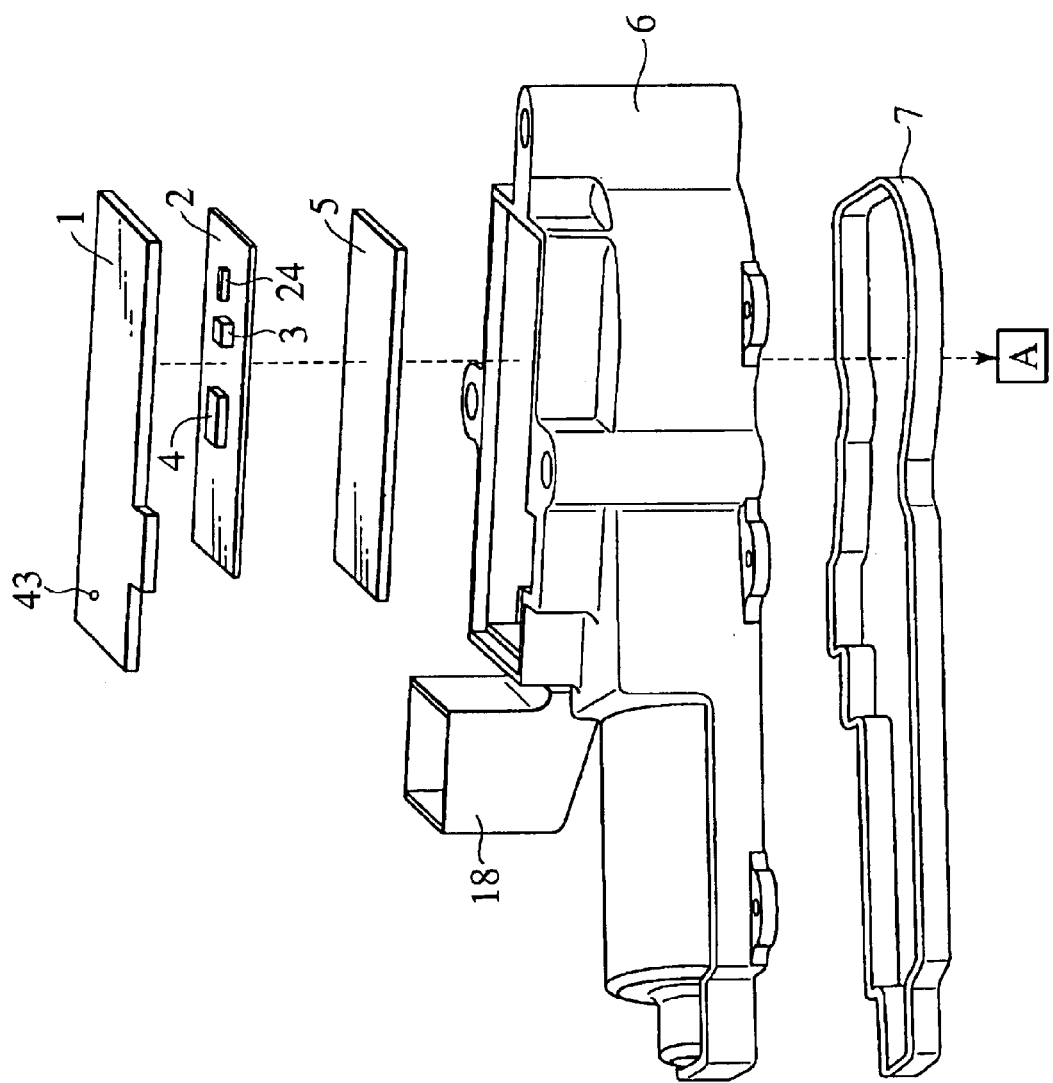
FIG. 2 is an exploded perspective view on the cover side of the shift controller according to one embodiment of the present invention.
Figure 4B:
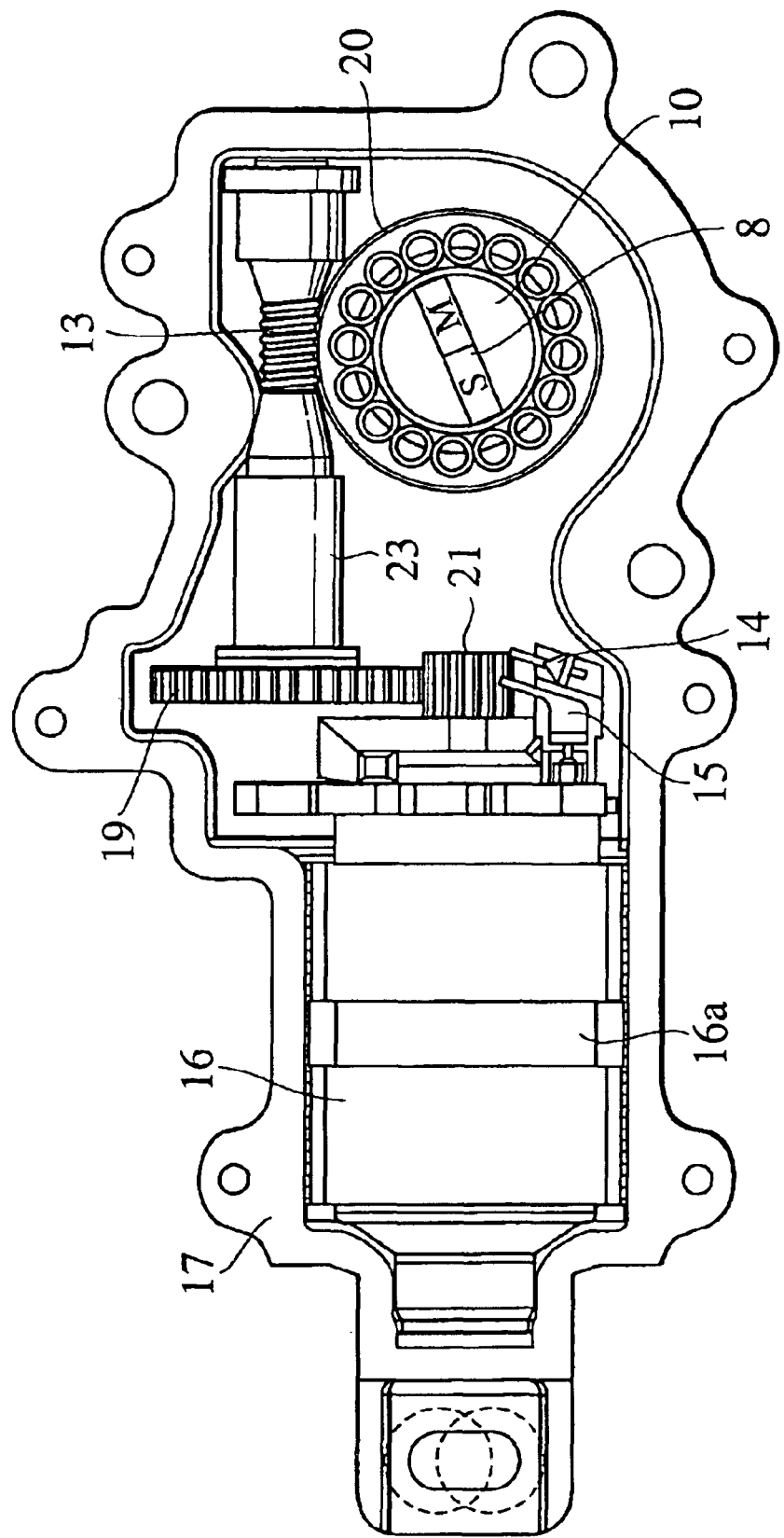
FIG. 4B is a top view on the housing side of the shift controller according to one embodiment of the present invention.

FIG. 2 is an exploded perspective view of the mechanical-electrical integrated type shift controller 41 which best represents the characteristics of the present invention. In FIG. 2, a motor 16 for generating the drive force has a first gear 21 as an output stage gear mounted on a motor output shaft of the motor 16, is received into a motor receiving portion of a gear case 17, and is secured to the gear case 17 by means of a metal band 16a. An intermediate rotating shaft 23, a second gear 19 and a third gear 13 are molded integrally, and as materials for the intermediate rotating shaft 23, the second gear 19 and the third gear 13, iron, aluminum, resins or the like may be employed, but in the present invention, iron material which is highest in strength is employed. The second gear 19 is arranged so as to mesh with the first gear 21, and the third gear 13 is arranged through a gear holder 12 so as to mesh with a fourth gear 20 molded integral with an output rotating shaft 11. As a result, the rotating shaft of the motor 1 and the output rotating shaft 11 are arranged at right angles. The gear mechanism is constituted as described above to thereby provide an advantage that a clearance between the gears can be made smaller than the case where the gear mechanism is constituted merely by a plane gear. The output rotating shaft 11 is formed at its extreme end with a counterbore, and engaged so as to transmit torque by fitting with a shift rail 54 (see FIG. 9) of the transfer case assembly 33. A magnet holder 10 is fitted in the upper surface of the fourth gear 20 or connected by bonding. A yoke 9 made of a magnetic material is connected to the magnetic holder 10 by fitting or bonding, and a magnet 8 is connected to the magnetic yoke 9 by fitting or bonding. The magnet 8, the magnetic yoke 9, the magnet holder 10 and the output rotating shaft 11 are all connected so as to be rotated synchronously. In FIG. 2, a connector 18 is molded integrally with a board case 6 also serving as a gear cover, and the connector 18 is used for communication with the shift controller outside, supply of power supply, and input of an ignition signal. A heatsink or radiating plate 5 is bonded to the board case 6 with an epoxy or silicone adhesive bond, and a circuit board 2 is bonded to the heatsink 5 with the epoxy or silicone adhesive bond. A sensor 3, a microcomputer 4, and EEPROM 24 are mounted on the circuit board 2, and a board cover 1 is bonded to the board case 6 with the epoxy or silicone adhesive bond so as to cover the circuit board 2. As shown in FIGS. 4A and 4B, the board case 6 is connected to a gear case 17 by screwing or the like through a seal material 7. At that time, the circuit board 2 and the terminal of the motor 16 are electrically connected through a motor connection terminal A14 and a motor connection terminal B15. The gear case 17 has a motor housing portion and a gear mechanism housing portion which are a metal housing. The board case 6 is secured to a housing (gear case 17) which is a resin cover with the seal 7 put therebetween, both of which define a space for receiving the motor and the gear mechanism. As described, the board case 6 is also provided with a function of covering the motor and the gear mechanism in which sense it can be called a motor cover or a gear cover.

Figure 9:
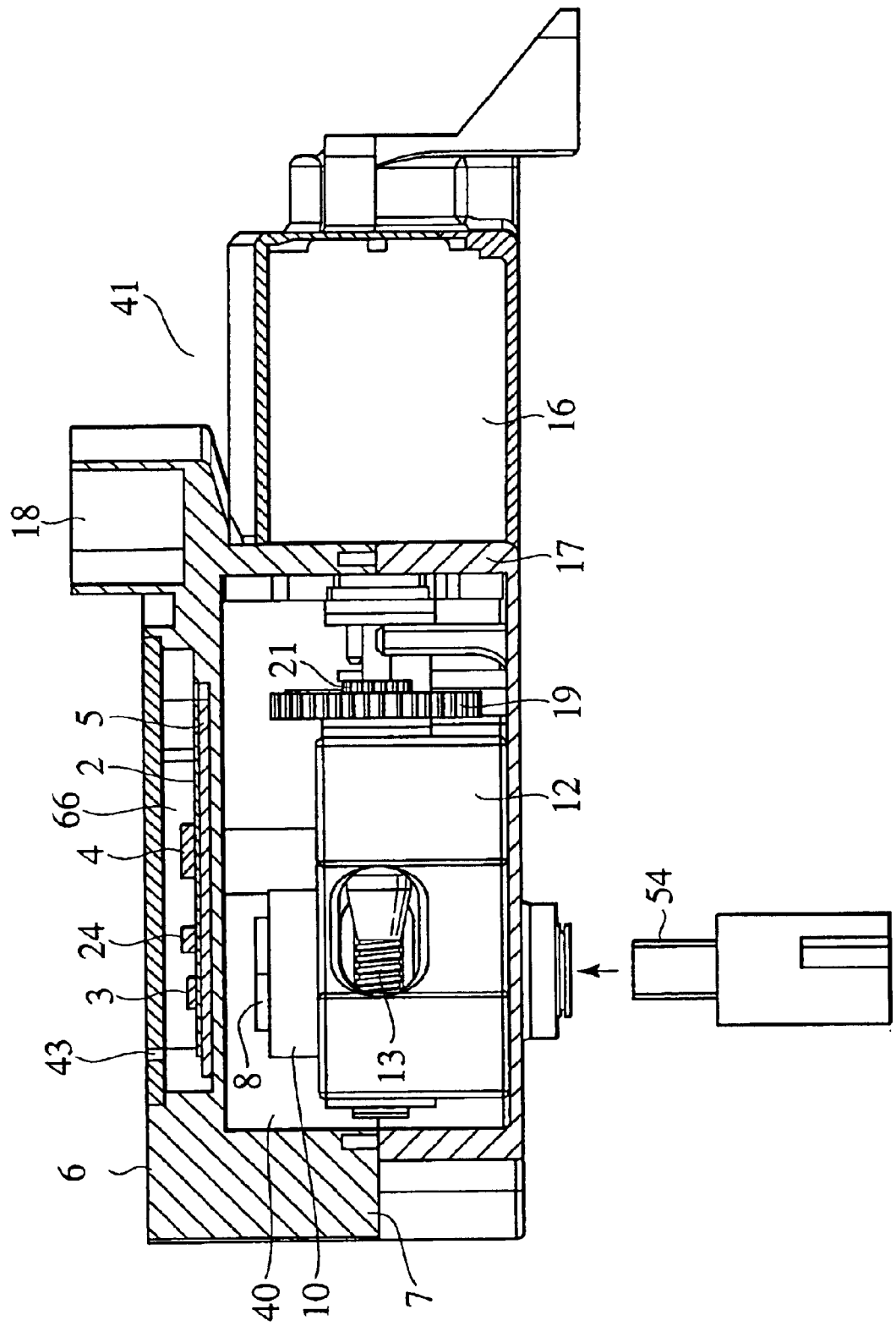
FIG. 9 is a longitudinal sectional view of the shift controller according to one embodiment of the present invention.

As for the mounting position of the motor, the motor and the intermediate rotating shaft may be arranged in parallel with each other, in addition to that shown in FIG. 9.

<Constitution of an Angle Detection Portion>

Figure 3:
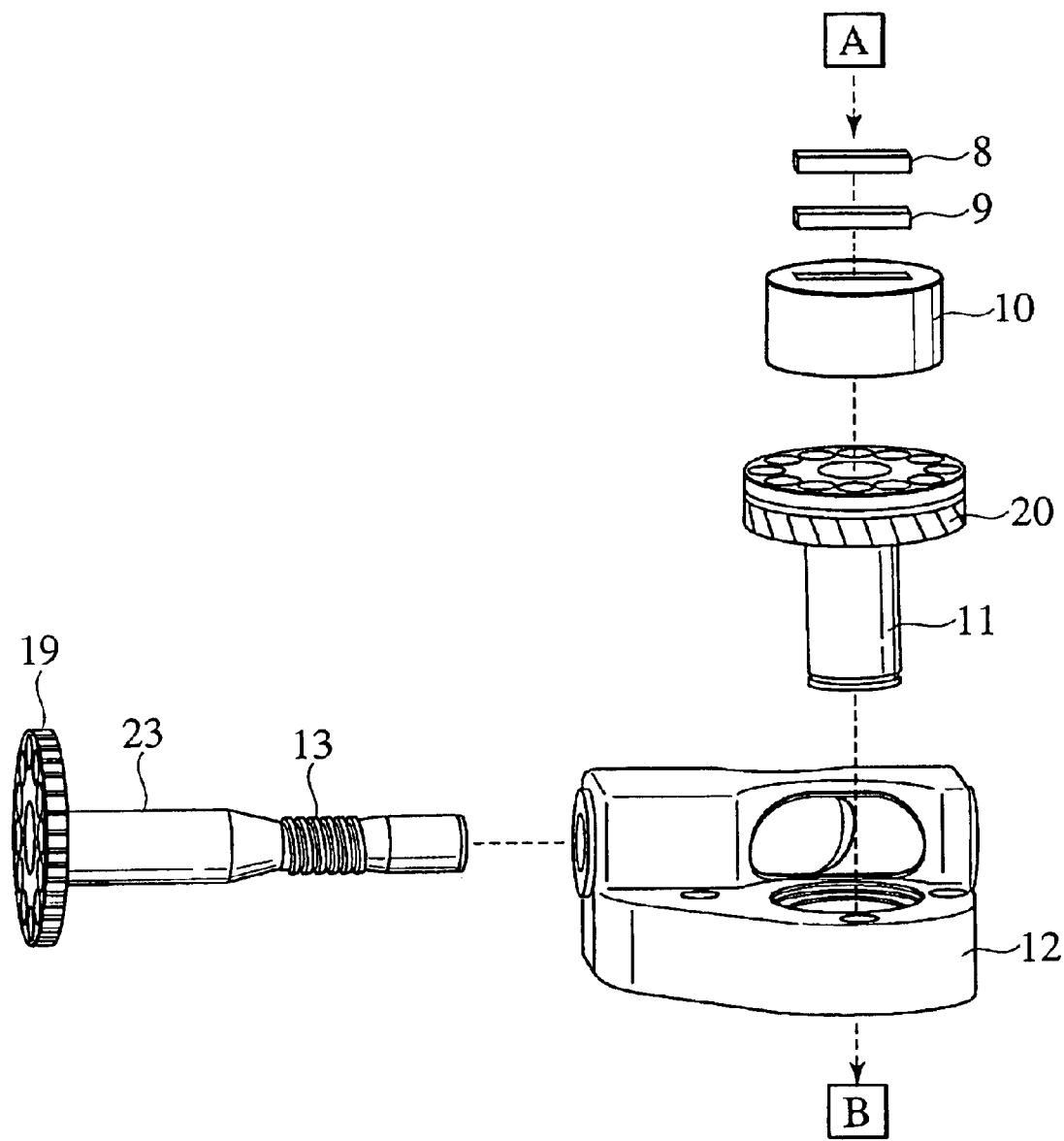
FIG. 3 is an exploded perspective view of a gear mechanism used for the shift controller according to one embodiment of the present invention.

FIG. 3 is a sectional view of a portion for detecting a rotation angle of an output rotating shaft 11. In FIG. 1 or FIG. 3, a magnet holder 10 is connected in contact with the output rotating shaft 11 so as to rotate synchronously with the output rotating shaft 11. The magnet holder 10 is provided with a groove for fixing a magnet 8 and a magnetic yoke 9 in a stabilized condition. It is desired that the magnet 8 and the magnetic yoke 9 are in contact, and in the present invention, they are bonded to each other using an epoxy adhesive bond, but the magnet 8 and the magnetic yoke 9 may be molded integrally. The magnet 8 and the magnetic yoke 9 are adhered to the magnet holder 10 with an epoxy adhesive bond. However, fitting-in or insert molding of the magnet 8 and the magnetic yoke 9 at the time of molding the magnet holder 10 is also enabled. The lower surface of the board case 6 is positioned away from the upper surface of the magnet 8, as shown in FIG. 2. The heatsink 5 is connected to the board case 6 with an epoxy or silicone adhesive bond, and the circuit board 2 is connected to the heatsink 5 by the epoxy or silicone adhesive bond. The sensor element 3 is arranged within a magnetism distribution space of the magnet 8 and on the circuit board 2. In this case, it is desired that the sensor element 2 is disposed on the rotating shaft of the magnet 8, but generally, a deviation occurs due to the assembling tolerance or the like. However, if the center of the sensor element 3 is disposed within a circle of about 5 mm in diameter, it can be corrected by a calibration described later.

A main function of the shift controller 41 is to cause the rotation angle of the output rotating shaft 11 to follow the target rotation angle. To this end, it is necessary to detect the rotation angle of the output rotating shaft 11 with high accuracy. Further, the rotation operating range of the output rotating shaft 11 is from 0 to 280 degrees, and a mechanism capable of detecting an angle over substantially whole region (360 degrees) is necessary. Various systems for detecting a rotation angle such as a non-contact type using a Hole element have been heretofore devised. In the present invention, the magnet 8 is secured to the output rotating shaft 11, and a change of direction of the magnetic field is detected using the sensor element 3 on the circuit board 2 to thereby realize the detection of the rotation angle over the whole region (360 degrees).

Attention should be paid generally in using the magnet to the unexpected disturbance of a magnetic circuit. In the present invention, it is feared that a first gear 21, a second gear 19, a third gear 13, a fourth gear 20 and the output rotating shaft 11 are possibly formed of magnetic bodies such as iron to give unexpected influence to the magnetic circuit around the magnet 8. Accordingly, it is necessary that the magnet 8 is distanced to some extent from the magnetic bodies such as the first gear 21, the second gear 19, the third gear 13, the fourth gear 20 and the output rotating shaft 11. In the present invention, the magnetic body closest to the magnet 8 is the output rotating shaft 11, and with respect to coercive force 304 (KA/m) and the remanent flux density 470 (mT), the distance between the magnet 8 and the output rotating shaft 11 is 20 mm. In order not to affect on the magnetic circuit around the magnet, the magnetic holder 10 will suffice to be a non-magnetic body, and in consideration of the processing property or the rigidity, resin or aluminum may be employed. In the present invention, the resin is employed.

The magnetic holder 10 keeps the distance between the magnet 8 and the output rotating shaft 11 constant and further has a function of securing the magnet 8 to the shaft B11 so that the magnet 8 may be rotated in synchronism with the output rotating shaft 11. Further, the magnet holder 10 also bears a function of adjusting the distance (hereinafter referred to as the air gap) between the magnet 8 and the sensor element 3. This air gap is very important, and where the air gap is too longer than the set value, the magnetic force of the magnet 8 reaching the sensor element 3 is so small that the sensor element 3 cannot be activated. Contrary to this, where the air gap is shorter than the set value, the magnet 8 comes in contact with the board case 6 to impair the rotational motion of the output rotating shaft 11, or the magnetic force applied to the sensor element 3 is too large that unexpected damage is possibly given to the sensor element 3.

Figure 7:
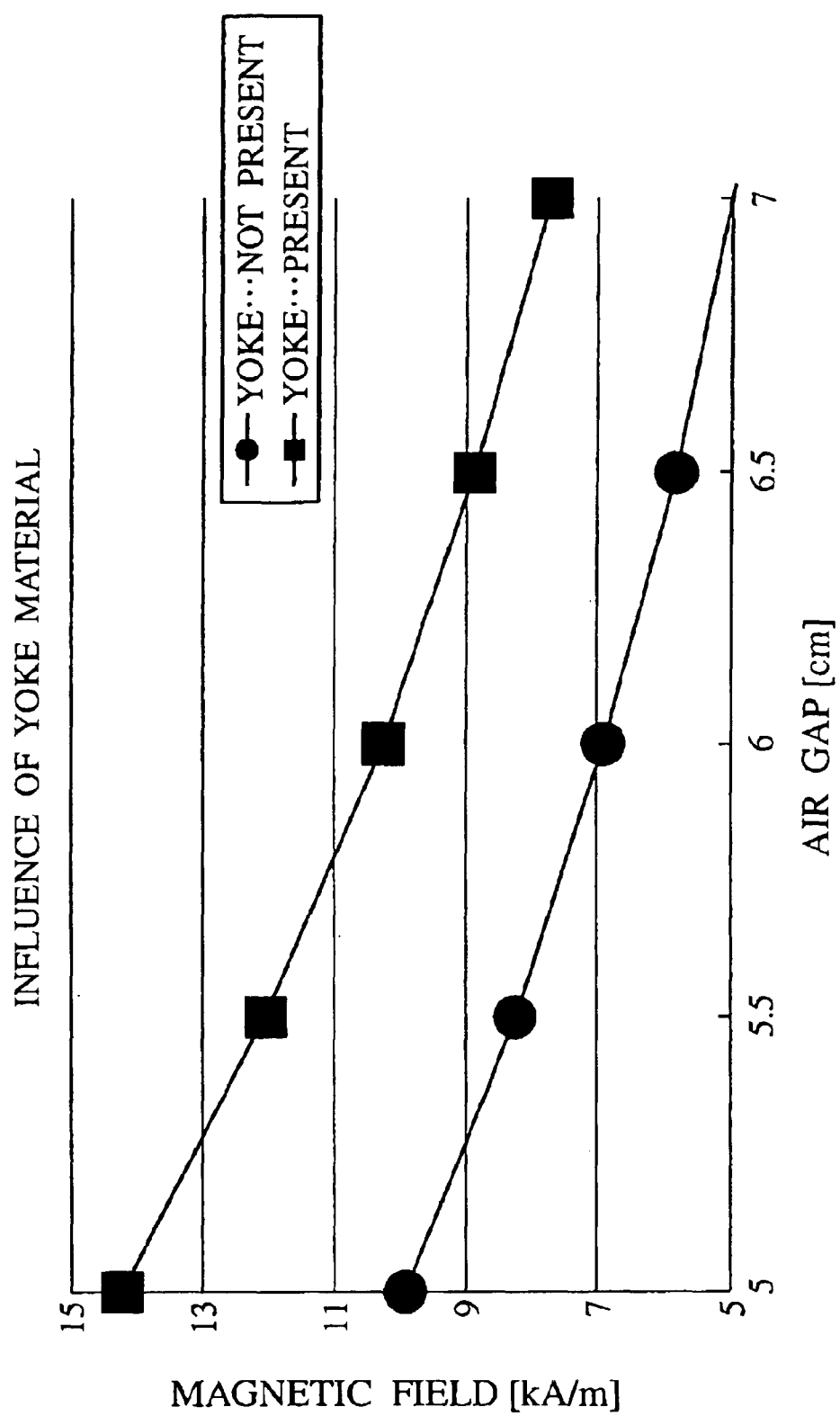
FIG. 7 is an explanatory view of the effect of the rotation detection device according to one embodiment of the present invention.

Next, designing of the magnetic circuit using the magnetic yoke 9 will be mentioned. Where the magnetic body is not present around the magnet 8, magnetism radiated from the magnet 8 flows from N pole to S pole substantially symmetrically with respect to a plane around the magnet (see FIG. 6A). Accordingly, magnetism is generated also in a space opposite a space where the sensor element 3 is positioned, failing to realize an effective magnetic circuit. Therefore, the magnetic yoke 9 is arranged so as to come in contact with a lower part of the magnet 8 (opposite the sensor element 3) in order to realize the effective magnetic circuit (see FIG. 6B). However, the magnetic yoke 9 should be a magnetic body. Further, attention should be paid to the shape of the magnetic yoke. If the magnetic yoke 9 is thin, the magnetic characteristic of the magnetic yoke becomes saturated, and magnetism leaking into the external space of the magnetic yoke 9 increases, failing to constitute an effective magnetic circuit. Accordingly, the thickness of the magnetic yoke 9 will suffice to be a thickness to a degree that the magnetic characteristic of the magnetic yoke is not saturated, and relies upon the magnetic characteristic of the magnet 8. In the case of the present invention, the thickness of the magnetic yoke 9 with respect to the magnet 8 is desirably not less than 2 mm, and actually 3 mm is employed. It is desired that a sectional area of the magnetic yoke 9 in a direction vertical to the rotating shaft is equal to that of the magnet 8. The reason is that if the sectional area is too wide, the magnetic circuit at the lower part of the magnet becomes widened, whereas it is too narrow, the component which does not pass through the magnetic yoke 9 among the magnetism radiated form the lower part of the magnet increases. The influence of the presence and absence of the magnetic yoke 9 was obtained by analysis. The results are shown in FIG. 7.

Figure 5:
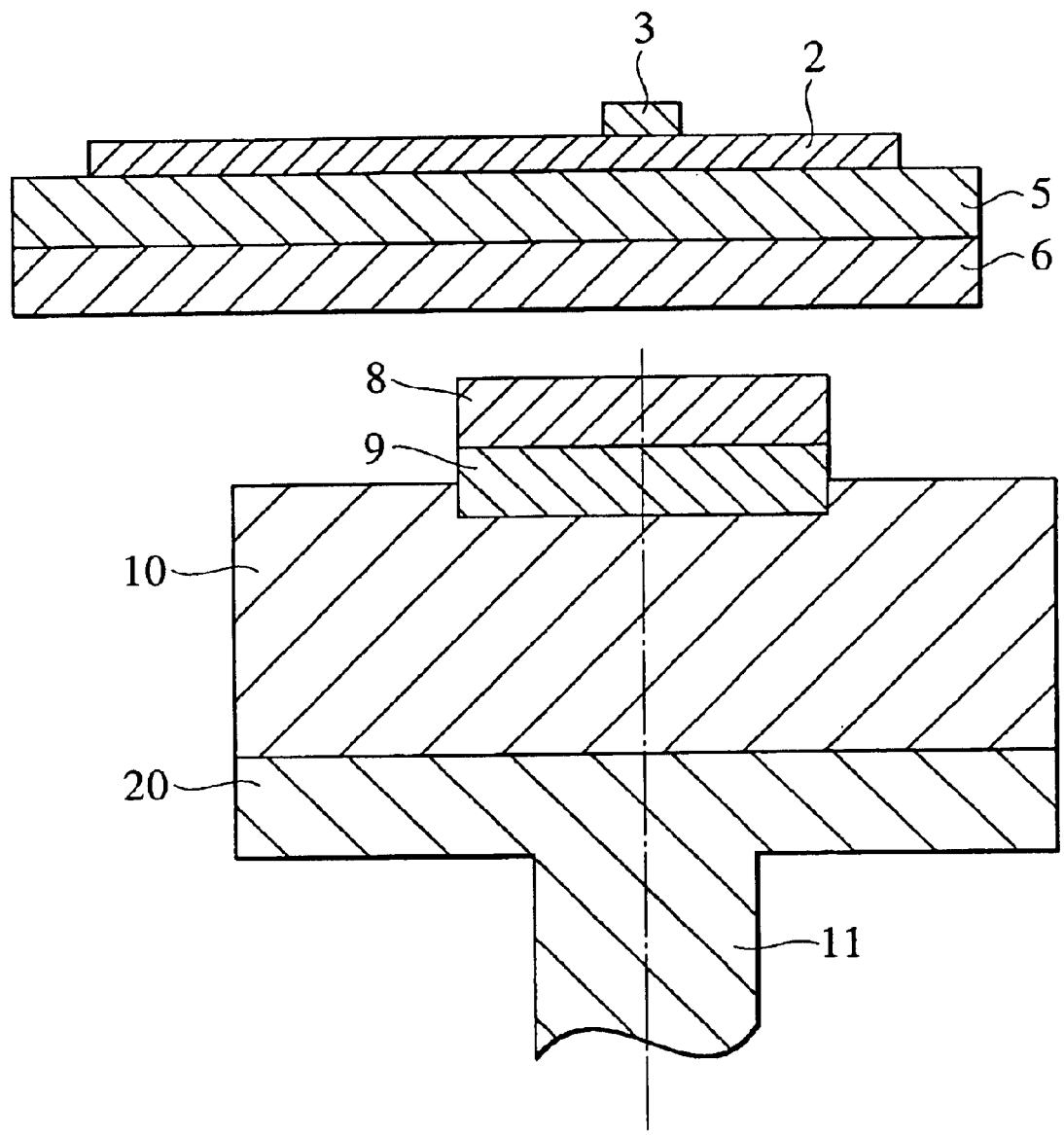
FIG. 5 is a longitudinal sectional view of a rotation detection device according to one embodiment of the present invention.

In FIG. 5, the solid line represents the case where the magnetic yoke is present, and the broken line represents where the magnetic yoke is absent. The magnetic yoke 9 having the shape as described is employed whereby the magnetic circuit at the lower part of the magnet 8 is limited to a determined space (see FIG. 4(b)), and the magnetic force applied to the sensor element 3 can be strengthened about 40 percent as compared with the case where the magnetic yoke 9 is absent. Accordingly, by using the magnetic yoke 9, the effective magnetic circuit can be realized. In the present invention, SUS430 is used for the magnetic yoke 9, but even the magnetic body having the magnetic characteristic equal thereto, for example, such as S45C or S15C can be applied to the present invention.

Further, in the present invention, when the magnetic force which passes through the sensor element 3 is within the range of from 10 kA/m to 15 kA/m, the output of the sensor element 3 reacts in the direction of a magnetic field which passes through the sensor element 3 is not affected by the magnitude of magnetic field. Further, the circuit board 2, the heatsink 5, and the board case 6 are positioned between the magnet 8 and the sensor element 3, of which thicknesses are about 1 mm, about 2 mm and about 2 mm, respectively. When the distance from the board case 6 to the surface of the magnet 8 is set to about 1 mm, the distance between the magnet 8 and the sensor element 3 is 6 mm in total. In consideration of the election tolerance or the process tolerance, that distance is about 6 mm±1 mm. Therefore, material and shape of the magnet 6 are determined from the condition of distance (about 6 mm±1 mm) and the condition of the magnetic force which passes through the sensor element 3 (10 kA/m to 15 kA/m). Table 1 shows the magnetic material and its characteristics being used at present. In the present invention, a SmFeN magnet which is in better conditions is employed. It is desired that the directivity of magnetic field passing through the sensor element 3 is in synchronism with the rotation of the magnet 8. Because of this, it is desired that the shape of the magnet is symmetrical about the center shaft, and as shown in FIG. 8, a disk shape, a donut shape, a trapezoidal shape, a bar-like shape or the like may be employed. In the present invention, a bar-like magnet (20 mm×4 mm×3 mm) is used in consideration of easiness of processing.

TABLE 1

| KIND | Br(T) | Hc (kA/m) | TEMPERATURE COEFFICIET OF Br | PRICE (FERRITE) | PRODUCTIVITY | JUDGEMENT |
|---|---|---|---|---|---|---|
| Ferrite | X 0.2 | X 150 | X −0.18 | ⊙ 1 | X DIFFICULT | X |
| Alnico | ○ 0.6 | X 45 | ⊙ −0.02 | ○ 5–10 | X DIFFICULT | X |
| SmFeN | ○ 0.47 | ○ 304 | ○ −0.06 | ○ 10–15 | ○ EASY | ⊙ |
| Nd—Fe—B | ⊙ 1.2 | ○ 880 | X −0.13 | ○ 15–20 | ○ EASY | X |
| Sm—Co | ○ 0.9 | ○ 690 | ○ −0.04 | X 20–25 | ○ EASY | X |

<Isolation Constitution of a Circuit Portion>

Figure 10:
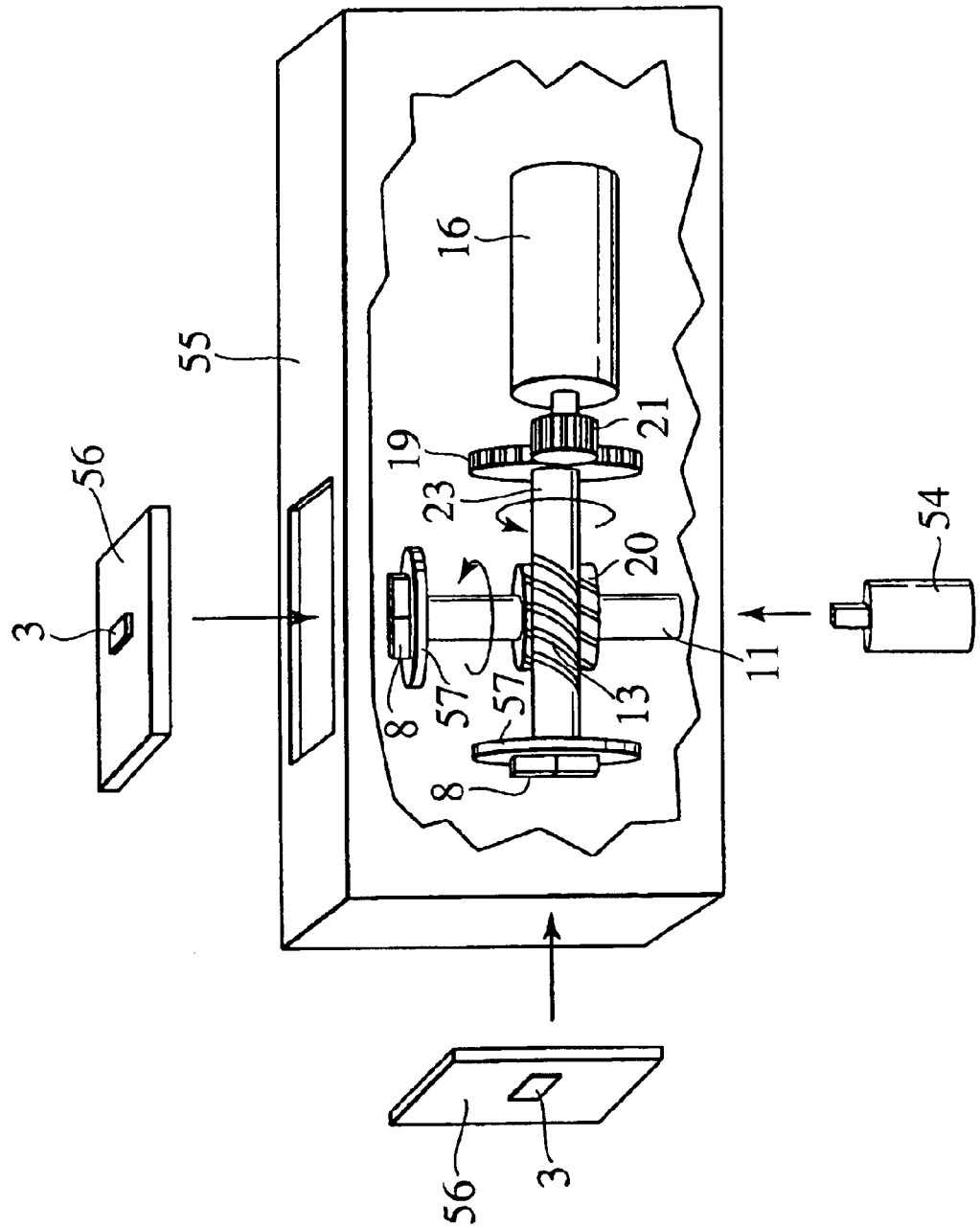
FIG. 10 is an explanatory view of operation of the shift controller according to one embodiment of the present invention.

FIG. 9 shows the internal constitution of the shift controller 41. In a gear chamber 40 formed by the gear case 17 and the board case 6 are arranged mechanical portions including the rotational bodies such as the first gear 21, the second gear 19, the third gear 13, the gear holder 12, the magnet 8, the magnetic yoke 9 and the like. In the board case 6 is arranged a board chamber 66 including the circuit board 2, the heatsink 5, the sensor element 3, the microcomputer 4 and the like so as to be isolated from the gear chamber 40 through the gear chamber 40 and the board case 6. With this configuration, it is possible to protect the circuit board 2 from the substances such as dust, oil or the like contemplated to be generated in the mechanical portions, which substances adversely affects on an electronic circuit. Further, it becomes possible to realize the choice of a variety of assembling steps such that the mechanical portions and the electronic circuit portion are fabricated in a remote place, they are transported to a place where they can be assembled, and they are assembled later. Further, as shown in FIG. 10, there is contemplated as a partitioning wall for isolating a board chamber 66 from the gear chamber 40, a combination of the board or the board case or a heatsink 56 or a gear case 55 and the board or the board case or a heatsink 56. Further, as a mounting position of a board chamber 66, there is contemplated on the rotating shaft of the final output shaft or on the rotating shaft of the intermediate gear.

<Radiation of the Board>

It is determined that the range of operating ambient temperature of the shift controller 41 is from −40 degrees to 125 degrees. In particular, the operation at high temperature poses a problem, and at the time of driving the motor 16, the rise of temperature of the circuit board 2 is expected. Under the temperature conditions exceeding 150 degrees, the operating compensation of the microcomputer cannot be done, and measures for radiation at the time of high temperature need be made without fail. Therefore, the heatsink 5 is disposed between the board case 6 and the circuit board 2. The purpose of arranging the heatsink 5 is for the measure for radiation, but simultaneously bears a function of a reinforcing material for the circuit board 2. Accordingly, as the material for the heatsink 5, those having high heat conductivity and high strength are desirable. Further, the heatsink 5 is disposed between the magnet 8 and the sensor element 3, and should not impair the magnetic circuit. Therefore, the heatsink 5 need be a non-magnetic body which does not affect on the magnetic circuit. In the present invention, aluminum (Al) is employed as material for the heatsink 5 in consideration of the foregoing conditions.

<Circuit Board>

Figure 11:
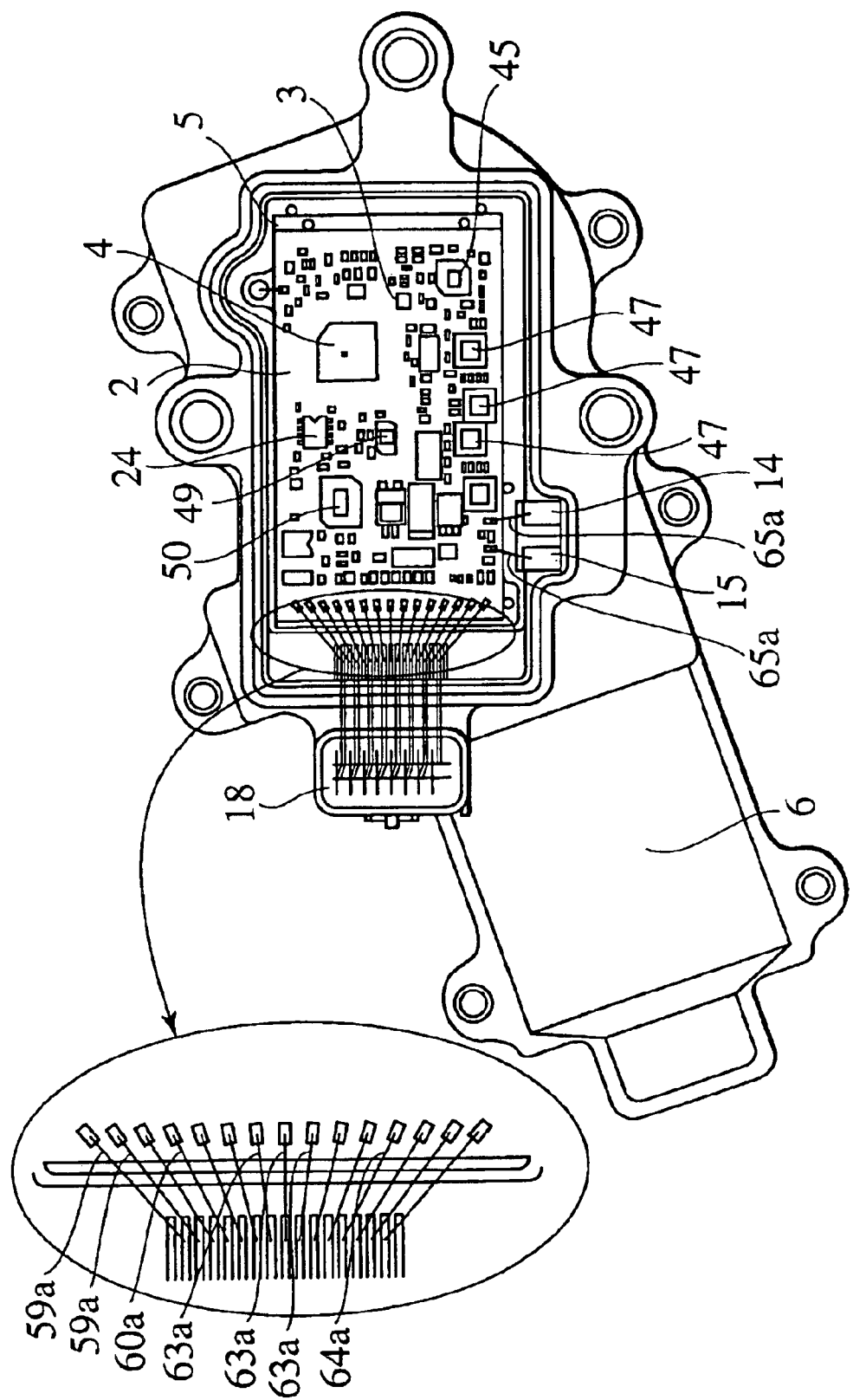
FIG. 11 is an explanatory view showing a concrete example of a circuit board of the shift controller according to one embodiment of the present invention.

The circuit board 2 is arranged between the magnet 8 and the sensor element 3 not to impair the magnetic circuit. Therefore, a material for the circuit board 2 is a non-magnetic body similar to the heatsink 5. Furthermore, in order to effectively radiate heat generated on the circuit board 2, the material is necessary to be high in heat conductivity. In the present invention, aluminum ($Al_2O_3$) is employed. FIG. 11 shows an arrangement of circuit parts on a circuit board 2. On the circuit board 2 are arranged a microcomputer 4, a sensor element 3, an amplifier 45, a motor drive circuit element 47, EEORIN 24, a regulator 49 and the like. These are connected to electrically one another and bear the control of the shift controller.

The position of the microcomputer 4 is not particularly regulated but any position will suffice as long as it is on the circuit board 2. The microcomputer 4 is operated in accordance with a predetermined program, and bears a function of deciding and controlling the operation of the shift controller. The concrete functions of the shift controller involve communication with the engine controller, output signal processing of the sensor element 3 described later, control of the motor 16 and the like. To this end, the microcomputer 4 or the circuit board 2 on which the microcomputer 4 is arranged need to provide a PWM output/sensor element signal for the motor control, and an A/D input for input of a target angle signal. In the present invention, H85/261 made by Hitachi Seisakusho is used as the microcomputer 4. The microcomputer 4 is provided with functions of an electrically re-writable flush memory, an A/D conversion input, a timer and the like.

The position of the sensor element 3 is within the magnetic distribution space of the magnet 8 and on the rotating shaft of the output rotating shaft 11, and it is desired that the arrangement surface of the sensor element 3 is parallel with the rotational surface of the magnet 8. However, actually, there are an error in the assembling step and an error in part processing, and a deviation is present in both coaxiality and parallelism. The deviation of both coaxiality and parallelism is one of causes that cannot be ignored of affecting on the output of the sensor element 3. In the present invention, the sensor element calibration described later is carried out in all the shift controller in order to remove the aforementioned influence.

Figure 12:
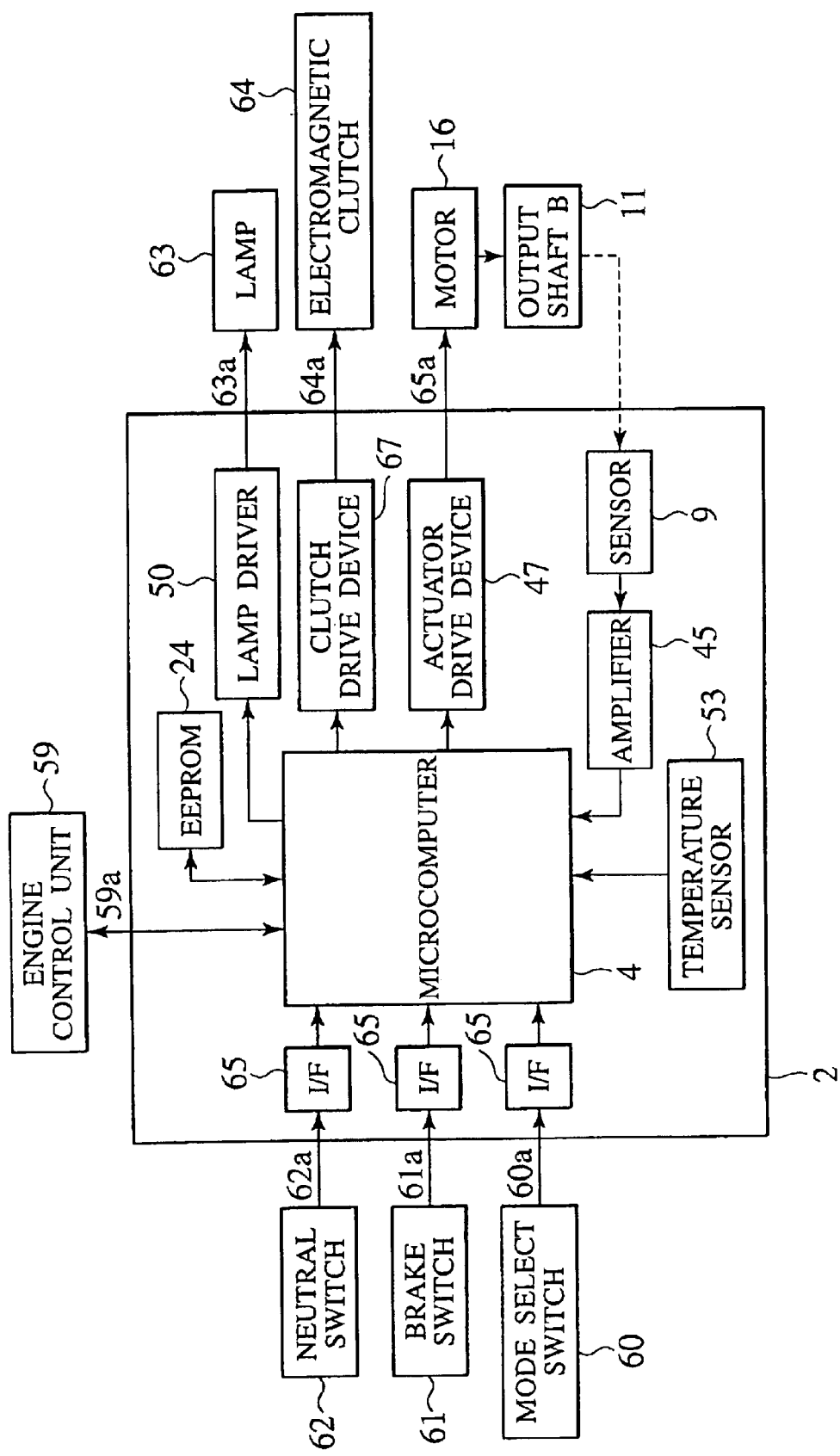
FIG. 12 is a function block diagram of the shift controller according to one embodiment of the present invention.

FIG. 12 shows a circuit function block on the circuit board. Since the amplitude of an output signal of a sensor element 3 is approximately 100 mV (at the time of 5 V supply), it is necessary for detecting an angle with higher accuracy to amplify the output signal of the sensor element 3 to input it into the microcomputer 4. To this end, the amplifier 45 bears a function of amplifying the output of the sensor element 3 to output it to the microcomputer 4.

The EEPROM 24 is used to store constant calculated in the sensor element calibration or to record the conditions of the shift controller 41.

The motor drive circuit element 47 comprises a H bridge circuit, and causes drive current to flow to the motor 16 in response to a motor drive command signal such as PWM output by the microcomputer 4.

One of the characteristics of the present invention lies in that on the circuit board 2 are arranged all circuit parts such as the microcomputer 4, the sensor element 3, the amplifier 45, the motor drive circuit element 47, the EEPROM 24, the regulator 49 and the like. This enables planning not only reduction of the number of parts such that a wiring between the sensor element 3 and the microcomputer 4, but also enhancement of reliability. Furthermore, exclusive mounting members for the sensor element need not be provided, and simplification of the sensing portion, reduction in the board size, and reduction in the shift controller size can be planned. Further, since a material for the board is aluminum, all or some of ICs can be mounted in the state of the paired chips. In the present invention, the regulator 49, the amplifier 45, the motor drive circuit element 47, and the lamp drive IC 50 are mounted in a bear-chip manner.

<Board Cover>

A board cover 1 is provided over the circuit board 2. The circuit board 2 is protected from the external causes such as water, dust or oil by the board case 6 and the board cover 1.

<Ventilation Hole>

However, in consideration of the using environmental conditions and the manufacturing process of the shift controller, there is feared of the change in temperature of a space in which the circuit board 2 is stored and arranged (hereinafter referred to as a board chamber 66). For example, at high temperature, internal air of the base late chamber 66 is inflated, but at low temperature, it is contracted. When the board chamber 66 is completely sealed from the external space, ventilation becomes disabled, and stress caused by inflation and contraction of air is applied to the board cover 1 and the board case 6. The board cover 1 or the board case 6 is probably broken due to the stress. Only the means for solving this problem is to provide a ventilation portion in the board case 6 or the board cover 1. The desirable conditions of the ventilation portion is excellent in water resistance, repelling properties, oil resistance, and heat resistance, and are able to realize stabilized and continuous ventilation. In the present invention, a ventilation portion 43 having a diameter of 1 mm is provided on the board cover 1, and a seal material having a porous construction is attached so as to cover the ventilation portion 43.

<Motor Connection Terminal>

Figure 13:
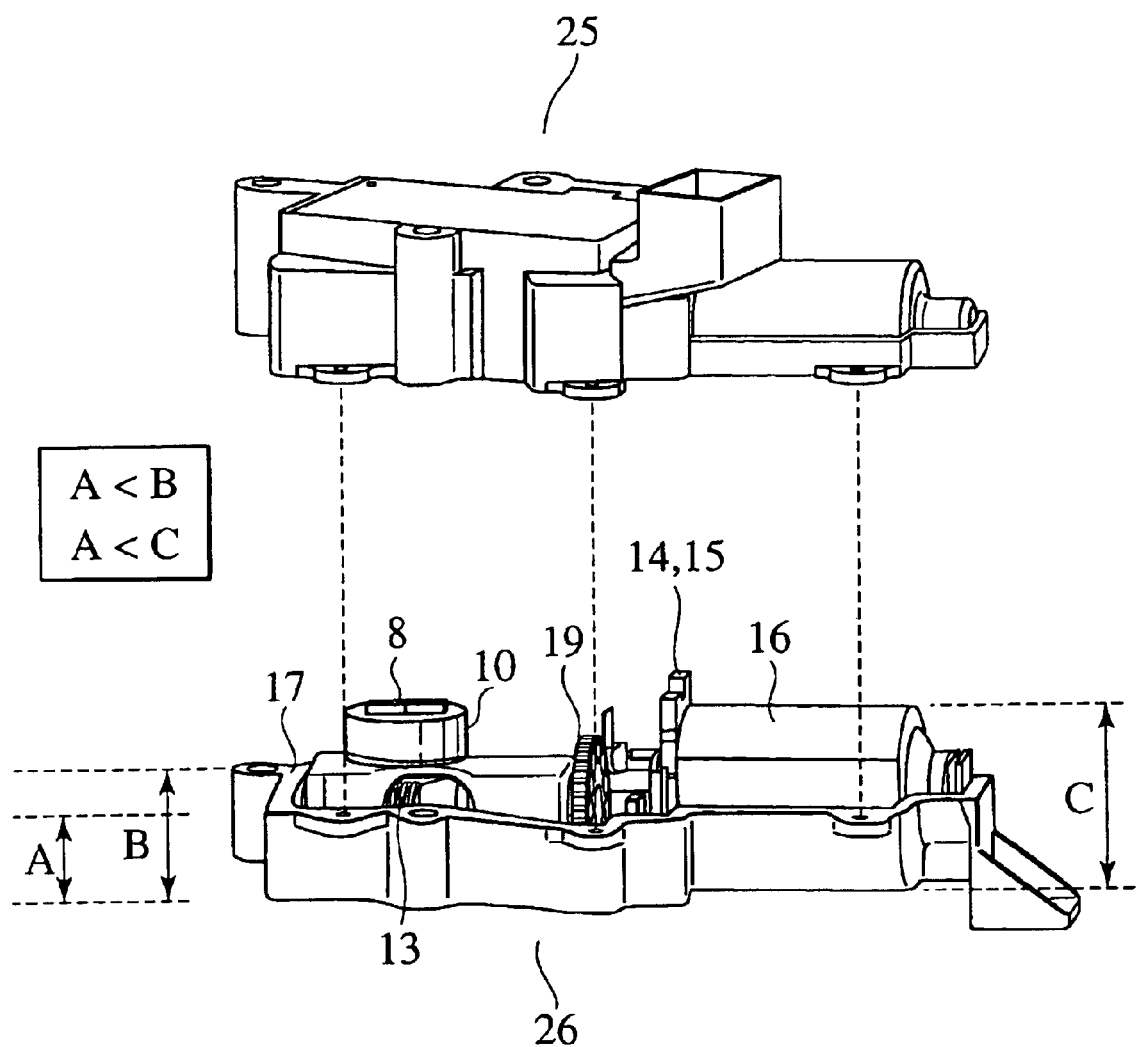
FIG. 13 is a exploded perspective view for explaining an assembly of the shift controller according to one embodiment of the present invention.

The motor drive current and the motor 16 on the circuit board 2 have to be connected electrically. As the concrete means, a conductor is used. In this method, however, after the circuit board 2, the motor 16 and the like have been assembled, the circuit board 2 and the motor 16 have to be joined newly by soldering or the like, which is not desirable in terms of work efficiency. Therefore, for connection of the circuit board 2 and the motor 16, fitting joining using an exclusive-use terminal or the like is desired. In the present invention, there is employed, for simplifying the assembling process, the construction in which the motor connection terminal A14 and the motor connection terminal B15 are molded integrally with the board case 6, which is fitted and joined to the motor terminal. This is a devise that after the circuit portion 25 and the mechanical portion 26 have been combined, both the portions are merely combined together whereby the circuit board 2 and the motor 16 are connected to each other (see FIGS. 4A, 4B and 13).

<Gear Constitution>

In the present embodiment, one characteristic is the arrangement constitution of the motor and the gear. In the assembling process of the mechanical portions, portions which require extreme time and technique are assembling and mounting steps of the motor and the gear. For simplifying the steps, there is employed the construction that the motor 16, the gear holder 12 and the output rotating shaft 11 can be assembled and mounted in the same direction with respect to the gear case 17 (see FIG. 3), and further, as will be understood from FIG. 13, there is constructed that the height of the motor 16 and the gear holder 12 is higher than that of the gear case 17.

<Gear Set>

Figure 14:
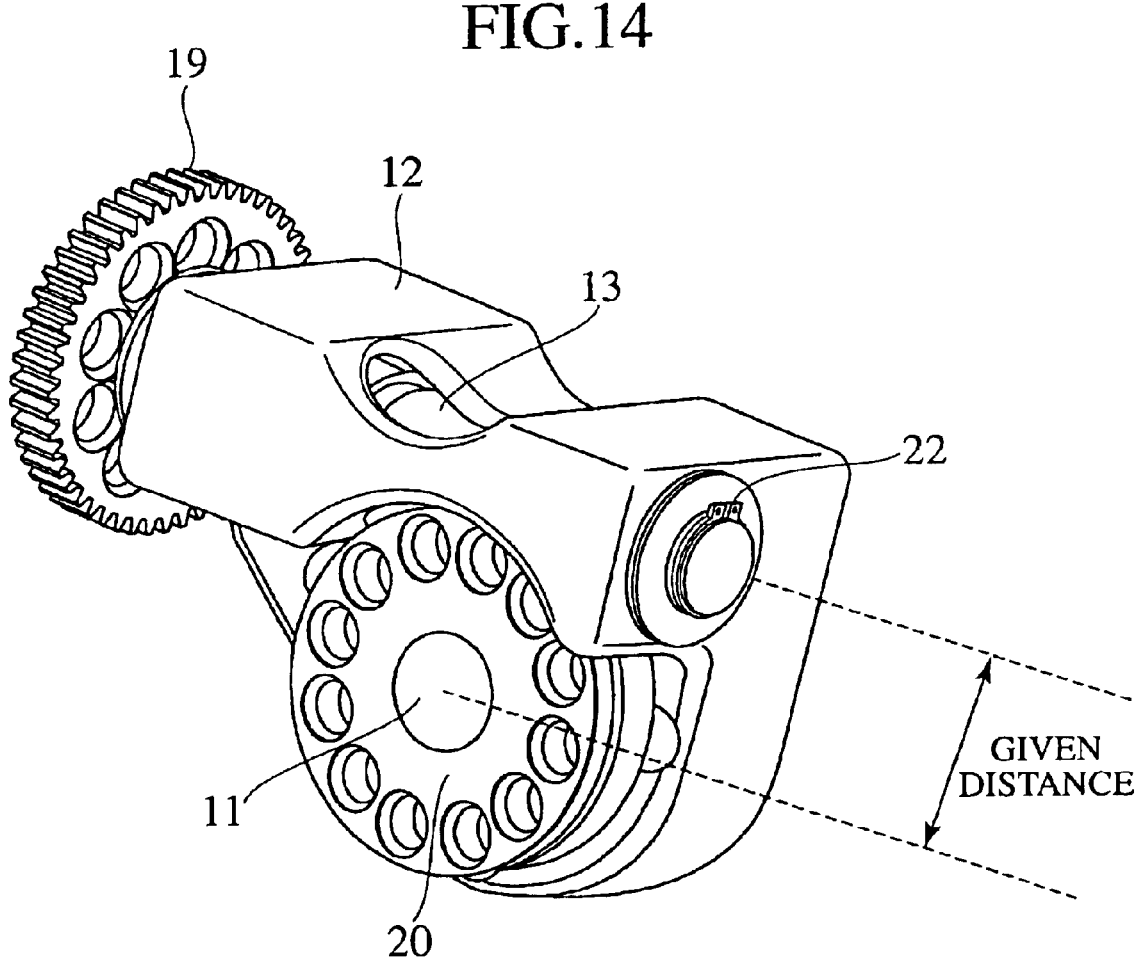
FIG. 14 is a perspective view for explaining an action of a gear mechanism of the shift controller according to one embodiment of the present invention.

FIG. 14 shows the constitution of a gear set. The gear holder 12 has two through-holes for bearings. The intermediate rotating shaft 23 integral with the second gear 19 and the third gear 13 is fitted and connected in one through-hole, and fixed axially by means of the clip 22. The output rotating shaft 11 integral with the fourth gear 20 is fitted and connected in the other through-hole.

It is necessary, for downsizing of the shift controller, to make the size of the motor small. However, generally, the motor size is in a proportional relation with the motor output torque, and torque enough to drive the transfer case 33 by the output rotating shaft 11 cannot be obtained merely by making the motor size small. Therefore, one or a plurality of gear stages, and torque generated in the motor 16 is amplified and transmitted to the output rotating shaft 11 through the gear stages. In a case of only one gear stage, the gear size of the rear stage becomes large, which is not desirable in terms of miniaturization of the shift controller 41. Accordingly, there is desired a method in which a plurality of gear stages are provided to dispose the gears efficiently whereby target torque in the output rotating shaft 11 is obtained. However, it is contemplated that by the provision of a plurality of gear stages, energy loss occurs in the respective gear stages. Therefore, a mechanism for raising the energy transmission efficiency of the gears is necessary. There is contemplated a method for raising the energy efficiency of the gears in which the frictional force between the shaft and the bearing is reduced, and meshing of gears is maintained in the ideal condition. The present embodiment employs a devise that the distance between the axial centers of the third gear 13 and the fourth gear 20 can be maintained constant by using the gear holder 12. Furthermore, the third gear 13 and the fourth gear 20 are incorporated into the gear holder 12 in advance, and the gear set is formed into module whereby the step when the gears are incorporated into the gear case 17 becomes easy.

<Sensor Calibration>

Figure 15:
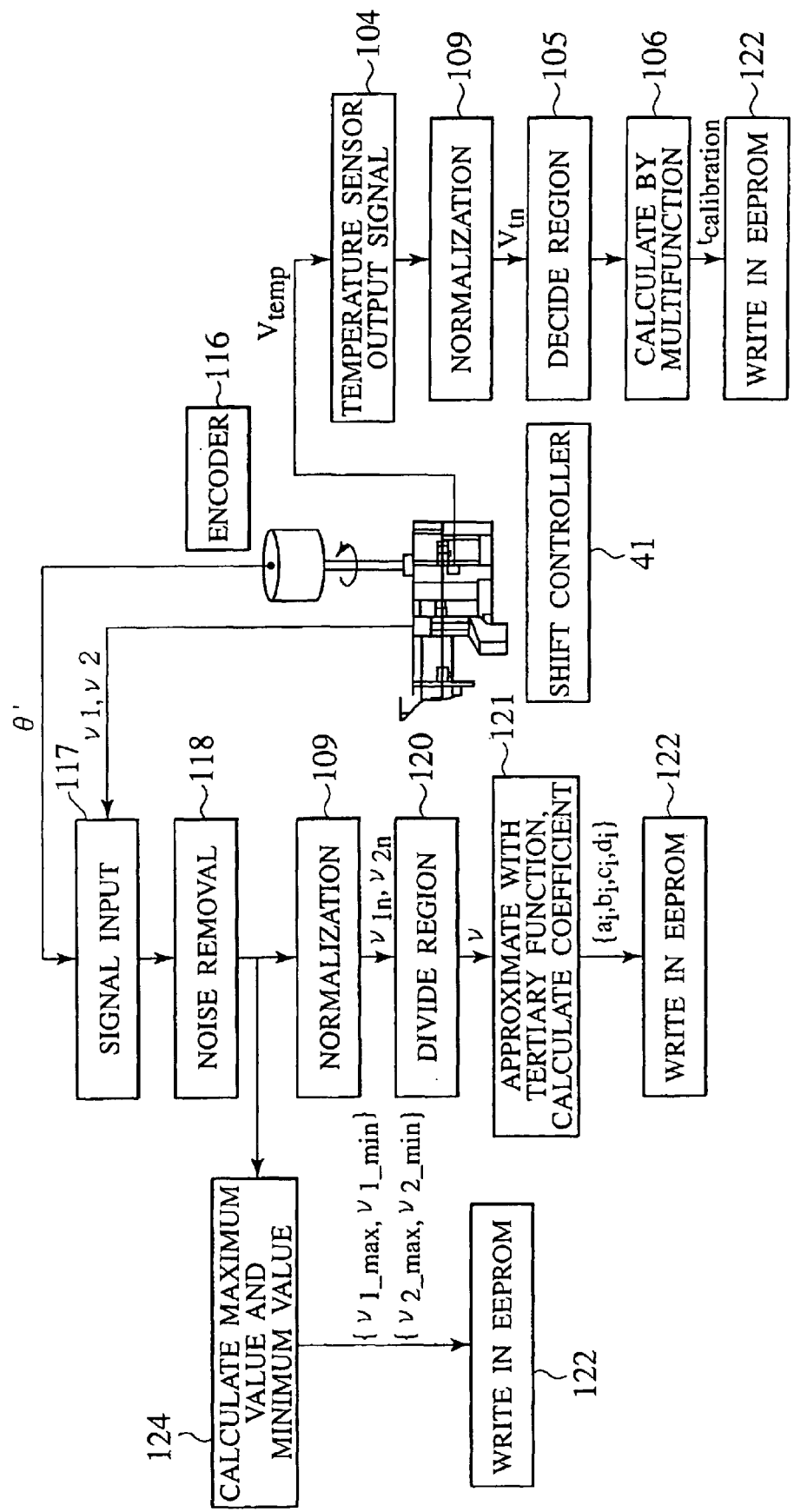
FIG. 15 is a function block diagram of the rotation angle detection technique according to one embodiment of the present invention.

Next, the sensor element 3 will be mentioned. Generally, in the sensor of which purpose is to detect a position and detect a rotation angle, where output of the sensor element is of an analogue type, a difference between parts occurs in output with respect to an object every sensor element or every product. The causes of the difference between parts reside in a deviation in position when the sensor element is mounted on the board, an error at the time of assembly or a difference in sensitivity with respect to an object in a single sensor element. Where the demand for performance with respect to the sensor element is high, this difference between parts cannot be ignored, and it is necessary to employ a method for eliminating the difference between parts by cancellation or the like. In the present embodiment, as one method for canceling the difference between parts, the following calibration is employed. FIG. 15 shows a block diagram of the sensor element calibration.

Figure 16:
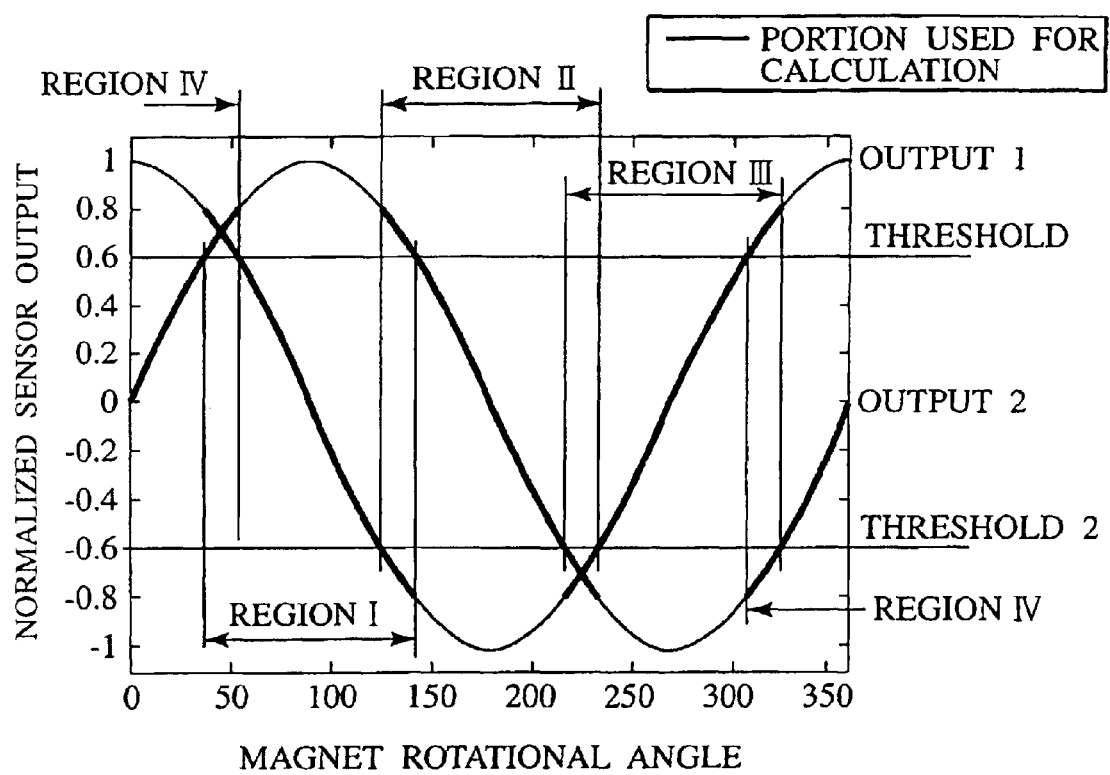
FIG. 16 is a waveform diagram for explaining the rotation angle detection technique according to one embodiment of the present invention.

In the calibration, first, the output rotating shaft 11 of the shift controller 123 and the rotary encoder 116 capable of detecting an angle to be a reference are arranged so that their rotating shafts are coaxial. Next, the motor 16 within the shift controller 116 is driven to rotate the output rotating shaft 11, and simultaneously, a absolute angle signal from the encoder and an output of the angle sensor element 3 are placed in synchronism with each other and read into a computer (117). In the computer, noises of the output signal of the sensor element 3 are removed (118), and normalization is accomplished so that the output of the sensor element 3 is 1 in maximum, and −1 in minimum (109). FIG. 16 shows a relation between the magnet rotation angle and the normalized signal. The sensor element 3 employed in the present embodiment has outputs of two systems, and the output signals are signals which are deviated in phase each other with respect to the direction of magnetic field passing through the sensor element 3. Next, the output signal of the sensor element 3 with respect to the magnet rotation angle is divided into four regions using normalized two signals and two thresholds (120). Table 2 shows the respective regions and conditions.

TABLE 2

| REGION | CONDITIONS | SENSOR OUTPUT USED FOR CALCULATION (: = v) |
|---|---|---|
| I | OUTPUT 2 ≧ THRESHOLD 1 | OUTPUT 1 |
| II | OUTPUT 1 ≦ THRESHOLD 2 | OUTPUT 2 |
| III | OUTPUT 2 ≦ THRESHOLD 2 | OUTPUT 1 |
| IV | OUTPUT 1 ≧ THRESHOLD 1 | OUTPUT 2 |

However, it is desired that the threshold level 1 is smaller than the value in which the output 1 and the output 2 cross on the positive side, and is desired that the threshold level 2 is larger than the value in which the output 1 and the output 2 cross on the negative side. Because, sometimes, where these two conditions are not fulfilled, there is present a region which does not belong to any region between the regions, and angles calculated from the sensor element output are discontinuous. Further, the value in which the output 1 and the output 2 cross is different every product due to the influence of the sensor element or the assembling tolerance. Considering this variation, in the present embodiment, the threshold level 1 is set to 0.6, and the threshold level 2 to −0.6.

Further, due to the approximation in a tertiary expression in the respective regions, the coefficients {a, b, c, d} of a tertiary function which minimizes E in the following Expression are decided.

$$v_{in} = \frac{v_i - (v_{i\_max} + v_{i\_min})/2}{(v_{i\_max} - v_{i\_min})/2} \{i = 1, 2\} \quad (1)$$

Wherein θ indicates the absolute angle calculated from the encoder output, and v indicates the variable used in the above-described calculation in each region, which is displayed by the bold line in FIG. 16. n indicates the sampling number in each region, and Xi indicates the i-th value of variable X.

In the present embodiment, since the region is divided into four, the coefficients to be calculated are 16 in total. Finally, the calculated coefficients are written into EEORIN 24 within the shift controller 123 and saved (122).

<Sensor Element Temperature Compensation>

Next, the temperature characteristics of the sensor element and the compensation method thereof will be mentioned. Generally, in the semiconductor or the sensor element formed of ferromagnetic such as iron, the reactivity with respect to the object or its own resistance value changes with temperatures (temperature-dependent). As mentioned hereinbefore, the range of the operating temperature of the shift controller is from −40 degrees to 125 degrees. Further, it is expected that the temperature conditions excess the above results momentarily. The influence given to the sensor element by the wide temperature change cannot be ignored, and need be compensated for by any means. In the present embodiment, after assembly of products, the sensor element output is subjected to calibration, and the sensor output is calculated using the calculated constant. Therefore, temperature compensation is carried out for the target that even if the temperature is changed, a sensor output equal to the sensor element output at the time of execution of calibration is obtained in a false manner. It is known that the sensor element 3 employed in the present embodiment changes its whole resistance value by temperatures, and the reactivity with respect to the magnetic field also changes. Further, when the output of the sensor element 3 is input into the microcomputer 4, the signal is amplified by the ope-amp. An offset voltage of the ope-amp is also temperature dependent, and in the present embodiment, and it is an object for compensation similar to the temperature characteristic of the sensor element 3. It is known that in the above-mentioned range of operating temperature (−40 degrees to 125 degrees), the change in the total resistance of the sensor element 3 changes by about 20%, and the reactivity with respect to the magnetic filed lowers by about 30%. In the present embodiment, in connection with the temperature characteristics, correction is carried out by software. By these temperature characteristics, there are tendencies that the output signal of the ope-amp lowers in mean value and reduces in amplitude as the temperature rises. However, since these two tendencies have linearity with respect to the temperature change, and therefore, correction can be made by the following Expressions.

$$E = \sum_{i=1}^{n} \{\theta_i^t - (a \cdot v_i^3 + b \cdot v_i^2 + c \cdot v_i + d)\}^2 \quad (2)$$

$$v_{i\_offsetcomp} := v_i + \alpha_{offset} \cdot (t_{calibration} - t)\{i = 1, 2\} \quad (3)$$

$$v_{i\_ampcomp} := \frac{v_{i\_offsetcomp} - v_{i\_mid}}{\alpha_{amp} \cdot (t - t_{calibration}) + 1} + v_{i\_mid}\{1 = 1, 2\} \quad (4)$$

Wherein $a_{offset} \cdot a_{amp}$ is constant obtained by experiments or the like, $t_{calibration}$ is a temperature when calibration is carried out, t is temperature around the sensor element, $v_{offsetcomp} \cdot v_{ampcomp}$ are values for which temperature characteristics of sensor element 3 output means value and amplitude are compensated for, and $v_{max} \cdot v_{min}$ are maximum value and minimum value of the sensor element 3 output when calibration is executed.

<Temperature Calculation>

Figure 17:
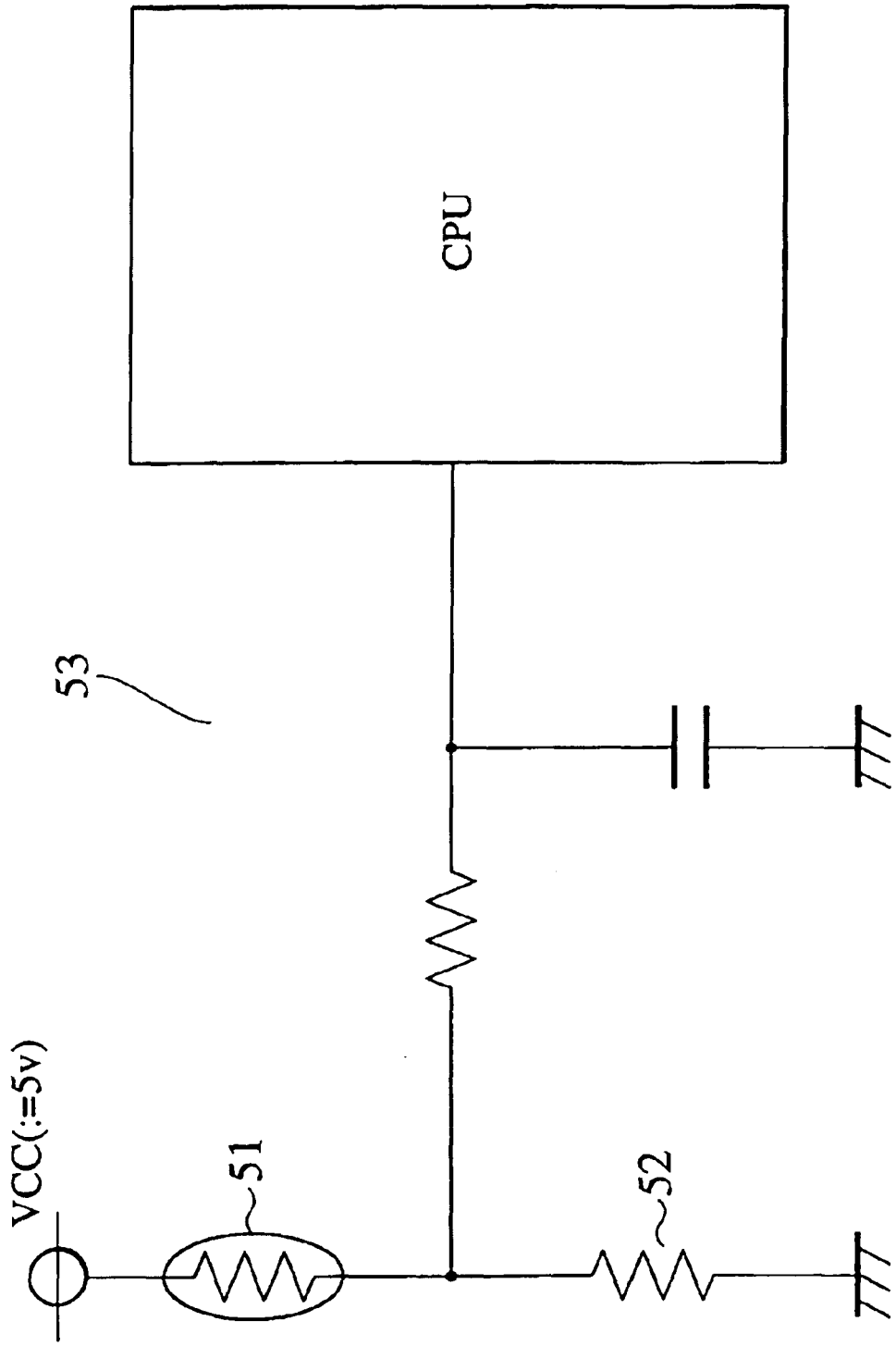
FIG. 17 is a circuit diagram for explaining part of a circuit of the shift controller according to one embodiment of the present invention.

In the case of the present embodiment, it is necessary to compensate the output of the sensor element 3 for the temperature characteristics thereof, and the temperature over the whole area in the range of operating temperature of the shift controller has to be detected. In the present embodiment, the circuit of FIG. 17 is used for the temperature sensor element to obtain an output corresponding to the temperature. The output of the temperature sensor is input into a computer such as a microcomputer to compute temperatures. If the output of the temperature sensor element has linearity with respect to the temperature, the temperature is calculated by a simple computation. However, actually, the temperature range in which the relation between the temperature and the temperature sensor element output has linearity is limited, and non-linearity results in the range of operating temperature of the shift controller. Calculation of temperature by concrete methods as mentioned below is contemplated. First, as one method, there is described a method for linear approximating B variable of a thermister to calculate temperatures. Generally, the B constant of a thermister is of a non-linear type with respect to an output ($v_{temp}$) of the temperature sensor element, which is linear approximated by the minimum square method.

$$v_{i\_mid} := (v_{i\_max} + v_{i\_min})/2 [i=1,2] \quad (5)$$

The B variable (:=B') in the linear form is substituted for Expression 6 described below to thereby calculate a temperature.

$$B' := 60.6/2^{10} \times 5 \cdot V_{temp} + 3198.2 \quad (6)$$

Wherein R:=5600, Ro:=10000, Vcc: 1023 (5 v), and To:=25+273.

However, it is necessary for carrying out computation of logarithm contained in the numeral 6 directly by a microcomputer to carry out 32-bit arithmetic calculation such as floating decimal point. Since this arithmetic calculation takes time for computation, log terms in Expression 6 are broken up, as in Expression 7, and further Maclaurin's series is expanded to thereby shorten the computation time.

$$t := \left\{ \frac{1}{B'} \cdot \log_e \left[ \frac{R}{R_0} \left( \frac{V_{cc}}{V_{temp}} - 1 \right) \right] + \frac{1}{T_0} \right\} \quad (7)$$

$$\log_e(X) = \log_e \left( \frac{2^n \cdot X}{2^n} \right) \quad (8)$$
$$= \log_e(2^n) + \log_e \left( \frac{X}{2^n} \right)$$
$$= n \cdot \log_e(2) + \log_e \left( \frac{X}{2^n} \right)$$

Further, the second method is a table method. In this method, a corresponding table of the actual temperature and the temperature sensor element output is prepared in advance, and the present temperature sensor element output and this corresponding table are used, and a temperature is calculated by a linear complement or a tertiary complement.

Further, the third method is an approximation method by way of a tertiary function. In this method, the actual temperature and the temperature sensor element output are approximated by a tertiary function, and its constant is stored or recorded. When a temperature is calculated, the temperature is calculated using the output of the temperature sensor element and the coefficient of the tertiary function. Further, where a temperature is desired to be obtained with high accuracy, the region is divided into some regions by the temperature sensor element output, and the actual temperature and the temperature sensor element output are approximated by the tertiary function every region, which coefficient is stored or recorded. When a temperature is calculated, the region is discriminated by the output of the temperature sensor element, and further, the temperature is calculated using the coefficient of the tertiary in that region and the output of the temperature sensor element (see Expression 9). In the present embodiment, the latter method is employed.

$$\log_e \left( \frac{X}{2^n} \right) = \sum_{i=1}^{\infty} \left\{ (-1)^{i-1} \cdot \frac{1}{i} \cdot \left( \frac{X}{2^n} - 1 \right)^i \right\}, \log_e(2) = 0.693 \quad (9)$$

Figure 18:
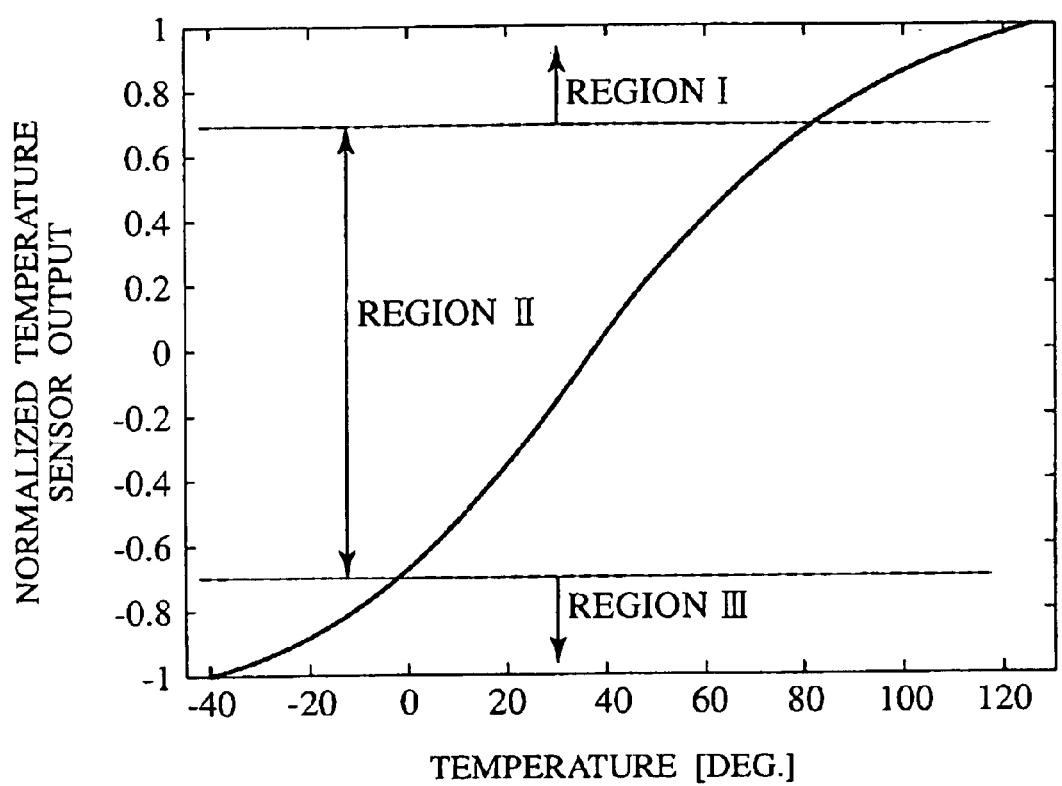
FIG. 18 is a characteristic diagram for explaining temperature compensation technique of a sensor according to one embodiment of the present invention.

Concretely, as shown in FIG. 18, the temperature sensor element output is divided into three regions according to the temperature sensor element output. The region dividing conditions and the coefficients {α·β·γ·σ} of the tertiary function approximated in the respective regions are given in Table 3.

TABLE 3

| REGION | CONDITIONS | COEFFICIENT | | | |
| --- | --- | --- | --- | --- | --- |
| | | α | β | γ | δ |
| I | 0.7 <= vn | 8.68E+02 | 1.96E+03 | 1.56E+03 | 4.29E+02 |
| II | −0.7 <= vn < 0.7 | 1.96E+01 | 4.94E+00 | 5.00E+01 | 3.77E+01 |
| III | vn < −0.7 | 5.84E+02 | −1.27E+03 | 1.03E+03 | −2.17E+02 |

Here, $v_{rn}$ is a value normalized so that the maximum value is 1 and the minimum value is −1 of the temperature sensor element output.

<Computation of Rotation Angle>

Figure 19:
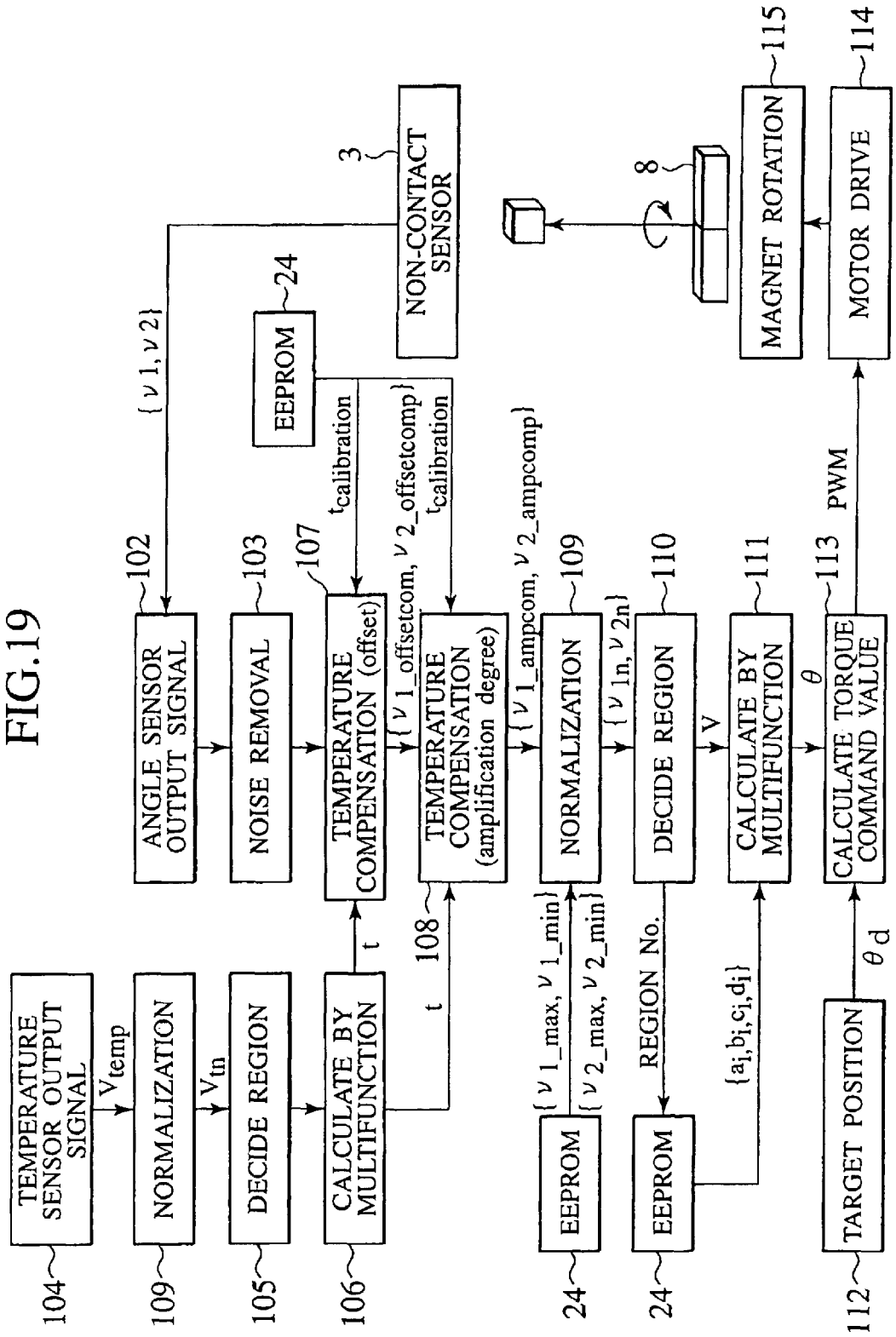
FIG. 19 is a function block diagram for explaining the temperature compensation technique of the sensor according to one embodiment of the present invention.

FIG. 19 shows the process for calculating the rotation angle from the output of the sensor element 3. Signals of two systems corresponding to the rotation angle of the magnet are output through the amplifier from the non-contact sensor while being affected by the magnetic circuit around the magnet irrespective whether or not the motor is driven. Noise components such as a periodical noise generated form the motor are sometimes included in the output signal of the amplifier, and where the noise components cannot be ignored, it is necessary to remove the noise components. In the present embodiment, a lowpass filter is provided on the output stage of the amplifier in order to remove the noises. A signal having passed through the lowpass filter is input into a computer such as the microcomputer 4. Therefore, it is necessary that a computer or an electronic circuit be provided with an analog input function. Further, a higher-order filter can be provided even within the computer. This is generally called a digital filter such as FIR or IIR, and the noise components can be removed more effectively. In the present embodiment, there is used a lowpass filter (cutoff frequency; 1 kHz) on the circuit board comprising a resistor (10 kΩ) and a condenser (0.1 μF). Further, an output of the temperature sensor element is input into a computer such as the microcomputer 4 (104), and a region is decided by the value of the temperature sensor (105). A temperature is calculated using the coefficient in each region calculated previously (106). In the computer such as the microcomputer 4, an output mean value of the sensor element 3 is compensated for the temperature characteristic from the signal from which noise was removed and the calculated temperature (107). Next, the output amplitude of the sensor element 3 is compensated for the temperature characteristic thereof using the signal for which the temperature characteristic of the output mean value of the sensor element 3 is compensated for and the calculated temperature (108). Further, the signal for which temperature is compensated for is normalized (109), and a region is discriminated using the conditions given in Table 2 (110). Since the coefficients of the tertiary function calculated every region at the time of calibration are stored in EEPROM, the rotation angle is calculated on the basis of Expression 9 using one value that should be used for computation out of the coefficients and the signals normalized of two systems (111).

$$t = \alpha \cdot v_{in}^3 + \beta \cdot v_{in}^2 + X \cdot v_{in} + \delta \quad (10)$$

Wherein θ indicates the calculated rotation angle, {a, b, c, d} indicates one belonging to the selected region out of the coefficients of the tertiary function calculated by calibration, and v indicates one value that should be used for computation out of the normalized signals of two systems. From the foregoing, the detection of the rotation angle of the rotating shaft 11 becomes enabled over the whole region in the range of operating temperatures and over the whole region of rotation angle (360 degrees).

<Control of Motor>

Next, a method for causing the output shaft to follow the target rotation angle will be mentioned. In the microcomputer 4 arranged on the circuit board 2, a torque command value given to the motor is calculated from the calculated present shaft rotation angle (111) and target rotation angle information (112) obtained from a mode selection signal. Various calculation methods are adopted for this calculation. In the following, there is defined that an angle increases in the right direction of rotation. For example, in a first method, the torque command value given to the motor has three types, i.e., constant on the positive side, zero, and constant on the negative sides. In this case, where the shaft rotation angle is smaller than the target rotation angle, the motor is rotated in the right direction at a determined Duty ratio, or where the shaft rotation angle is larger than the target rotation angle, the motor is rotated in the left direction at a determined Duty ratio. Then, when registered or reached near, torque is set to zero. In this method, however, where inertia of the motor or the output shaft is not sufficiently large, even if the torque given to the motor is set to zero, the phenomenon that the motor continues to operate with the inertia force occurs probably. As a result, the shaft rotation angle becomes enabled to stop or stand still within the target position deviation. In a second method, a deviation between the target shaft rotation angle and the present shaft rotation angle, differentiation of time and integration up to the time are computed, the weight is applied and the arithmetic sum is taken to provide the target value of the torque given to the motor. This is generally called a PID control. However, in the present embodiment, the rotation angle of the shaft is controlled, and in such a case, an integrator is included in the control object, because of which it is known in the control rule that the integrator is not necessary. Therefore, in the present embodiment, the PD control is to be employed.

No erroneous operation occurs in the control circuit due to the dust, oil or iron powder generated in the gear-receiving chamber.

No erroneous operation occurs in the rotation angle sensor or the signal processing circuit due to the dust, oil or iron powder generated in the gear-receiving chamber.

The constitution of the sensor mechanism for detecting the rotating position of 360 degrees of the output rotating shaft is simplified.

The resolution of the sensor is not affected by the gear ratio.

Since the sensor output signal is an analog signal, the continuous angle detection becomes enabled.

The distance between the rotational body and the sensor element can be made not less than 3 mm, and management of the distance between the rotational body and the sensor element becomes easy.

The generated magnetic flux of the magnet is effectively utilized, and no attenuation of magnetic flux occurs, because of which an inexpensive magnet can be used, and assembling becomes simple.

Since application of milling cutting for counterbore to the gear cover and the board cover is unnecessary, processing property is improved.

At the time of stalling a motor or at the time of backlash, an excessive load is not applied to gear portions, and therefore, there is less possibility of breaking the gears.

Since a conductor is not used to connect the motor and the circuit board, there poses no problem of breaking the conductor. Further, workability of connection work is improved.

Since radiation is effectively carried out from the control circuit board, no problem of erroneous operation of the control circuit occurs at high temperatures.

Since no pressure difference between the inside and outside of the circuit board receiving case comprising a housing and a cover occurs, there occurs no problem of breaking the control circuit board or the board case.

Since the assembling tolerance is made small, a deviation in a positional relation between the magnet rotational center shaft and the sensor element is reduced, thus reducing a problem that the sensor output is different for each product.

The sensor output is unsusceptible to the temperature around the sensor element, and accordingly, a problem that the resolution is deteriorated due to the change in temperature is eliminated.

The sensor mechanism is simple.

Since no counterbore need be provided in the gear case (housing) and the board case (cover), no problem that the distance between gears is varied due to the assembling tolerance or processing tolerance occurs.

While the invention has been described in its preferred embodiments, it is to be understood that the words which have been used are words of description rather than limitation and that changes within the purview of the appended claims may be made without departing from the true scope and spirit of the invention in its broader aspects.

An aspect of enforcement of the present invention is shown in the following.

1. The module to change a driving condition of a vehicle comprising:

a receiving casing for receiving a motor for drivingly rotating a shift rail of a transfer case and a gear mechanism for transmitting rotation of said motor to said shift rail;

a control circuit of said motor attached on the outer circumference of said receiving casing; and a cover member for defining a closed space for receiving said control circuit.

2. A module to change a driving condition of a vehicle comprising:

a motor for drivingly rotating a shift rail of a transfer case;

a gear mechanism for transmitting rotation of said motor to said shift rail; and a casing having a receiving recess for receiving said motor and said gear mechanism;

wherein an opening of the receiving recess of said casing is blocked by a cover member having a space in which the control circuit of said motor is closed and received.

3. A module to change a driving condition of a vehicle comprising:

a motor for drivingly rotating a shift rail of a transfer case;

a gear mechanism for transmitting rotation of said motor to said shift rail;

a receiving casing for receiving said motor and said gear mechanism; and a control circuit of said motor being mounted integral with said receiving casing; wherein
on the control circuit of said motor are arranged
a sensor for detecting a rotating position of said shift rail,
an amplifier for amplifying a signal of said sensor,
a signal terminal for receiving a desired position signal of said shift rail,
an output terminal for supplying power to said motor,
a motor drive circuit connected to said output terminal to control a power supply to said motor, and
a microcomputer for outputting a control signal to said motor drive circuit on the basis of a signal received by said signal terminal and a signal from said sensor.

4. The module to change a driving condition of a vehicle, wherein said control circuit of said motor further comprises
a lamp drive circuit for receiving a command signal from said microcomputer to control power supply to a lamp indicative of a control position of said shift rail, and
a lamp signal output terminal for outputting an output signal from said lamp drive circuit to outside.

5. The module to change a driving condition of a vehicle, wherein said control circuit of said motor further comprises
a lamp drive circuit for receiving a command signal from said microcomputer to control power supply to a lamp indicative of a control position of said shift rail, and
a lamp signal output terminal for outputting an output signal from said lamp drive circuit to outside.

6. A module to change a driving condition of a vehicle comprising:
a motor for rotating and driving a shift rail of a transfer case;
a gear mechanism for transmitting rotation of said motor to said shift rail;
a receiving casing for receiving said motor and said gear mechanism; and
a control circuit of said motor being mounted integral with said receiving casing, wherein
on the control circuit of said motor are arranged
a sensor for detecting a rotating position of said shift rail,
an amplifier for amplifying a signal of said sensor,
a signal terminal for receiving a desired position signal of said shift rail,
an output terminal for supplying power to said motor,
a motor drive circuit connected to said output terminal to control power supply to said motor, and
a microcomputer for outputting a control signal to said motor drive circuit on the basis of a signal received by said signal terminal and a signal from said sensor,
said case is integrally formed with two connectors,
one of the two connectors is provided with a command input terminal to which said signal terminal is connected, a power terminal and an earth terminal,
and the other is provided with a motor power supply terminal to which said output terminal is connected.

7. The module to change a driving condition of a vehicle, wherein said control circuit of said motor further comprises
a lamp drive circuit for receiving a command signal from said microcomputer to control power supply to a lamp indicative of a control position of said shift rail,
a lamp signal output terminal for outputting an output signal from said lamp drive circuit to outside, and
said one of the two connectors is further provided with a lamp signal terminal to which said lamp signal output terminal is connected.

8. The module to change a driving condition of a vehicle, wherein said drive circuit is installed between said microcomputer and said terminal, and said sensor is installed close to said microcomputer away from said drive circuit.

9. A rotation detector comprising:
a magnet mounted on a rotational body;
a detection element for detecting a change in magnetic field of said magnet which changes according to a rotating position of said rotational body; and
a magnetic material provided between said rotational body and said magnet.

10. A rotation detector comprising:
a magnet mounted on a rotational body;
a detection element for detecting a change in magnetic field of said magnet which changes according to a rotating position of said rotational body; and
a processing circuit for signal processing an output of said detection element to detect a rotating position of 360 degrees of said rotational body; wherein
said detection element outputs two sinusoidal wave signals which are different in phase, and
said processing circuit synthesizes signal changes of four 90-degrees sections which are uniform in signal change with respect to rotation of said two sinusoidal wave signals to detect a rotating position of 360 degrees.

11. A shift controller to change a driving condition of a vehicle, comprising:
an output member for applying an operating force to a device for switching a drive force transmission channel to wheels of a motor vehicle;
a motor for generating the drive force for rotating said output member;
a gear for transmitting the drive force of said motor to said output member
a gear case in which said motor, said gear and said output member are received
a sensor for detecting a rotation angle of said output member; and
a control circuit board including a control circuit of said motor;
wherein said control circuit board and a gear receiving portion are isolated by a partitioning wall on which said control circuit board is mounted.

12. The shift controller to change a driving condition of a vehicle, wherein a magnet is arranged so as to rotate in synchronism with said output member, an MR element which is a sensor element which reacts in the direction of magnetic field is arranged on said control circuit board, and a processing circuit for signal processing an output signal of said MR element is provided on said control circuit board.

13. The shift controller to change a driving condition of a vehicle, wherein said MR element is a GMR element.

14. The shift controller to change a driving condition of a vehicle, wherein there is provided a processing function (arithmetic algorithm) of linearizing the output of said sensor element for each specific region, connecting the respective regions, and continuously detecting the rotation angle of said rotational body over 360 degrees.

15. The shift controller to change a driving condition of a vehicle, wherein a radiating plate which is a non-magnetic body is provided for radiation of said control circuit board.

16. The shift controller to change a driving condition of a vehicle, wherein a yoke member made of magnetic material is disposed at a position in contact with said magnet and at a position opposite to said sensor element.

17. The shift controller to change a driving condition of a vehicle, further comprising a sensor mechanism for canceling by calibration a difference between parts of said sensor element output for each product.

18. The shift controller to change a driving condition of a vehicle, wherein there is provided a function of processing said sensor element output and an output of a temperature sensor, which is arranged on said control circuit board, by said control circuit, and compensating said sensor element output for the temperature characteristic thereof.

19. A shift controller to change a driving condition of a vehicle, comprising:

an output member for applying an operating force to a device for switching a drive force transmission channel to wheels of a motor vehicle;

a motor for generating the drive force for rotating said output member, a gear for transmitting the drive force of said motor to said output member;

a gear case receiving said motor, said gear and said output member are received;

a control circuit board including a control circuit of said motor;

a magnet rotated in synchronism with said output member; and a MR element which is a sensor element which reacts in the direction of magnetic field is arranged on said control circuit board and within the magnetism distribution of said magnet.

20. The shift controller for switching the drive state of a motor vehicle, wherein said MR element is a GMR reactive in the direction of magnetic field.

21. The shift controller for switching the drive state of a motor vehicle, wherein there is provided a processing function (arithmetic algorithm) of linearizing the output of said sensor element for each specific region, connecting the respective regions, and continuously detecting the rotation angle of said rotational body over 360 degrees.

22. The shift controller to change a driving condition of a vehicle, wherein a radiating plate which is a non-magnetic body is provided for radiation of said control circuit board.

23. The shift controller to change a driving condition of a vehicle, wherein a yoke member made of magnetic steel is arranged at a position in contact with said magnet and at a position opposite to said sensor element.

24. The shift controller to change a driving condition of a vehicle, wherein there is provided a function of canceling by calibration a difference between parts of said sensor element output for each product.

25. The shift controller to change a driving condition of a vehicle, wherein there is provided a function of processing said sensor element output and an output of a temperature sensor, which is arranged on said control circuit board, by said control circuit, and compensating said sensor element output for the temperature characteristic thereof.

26. A shift controller to change a driving condition of a vehicle, comprising:

an output member for applying an operating force to a device for switching a drive force transmission channel to wheels of a motor vehicle;

a motor for generating the drive force for rotating said output member;

a gear for transmitting the drive force of said motor to said output member;

a gear case receiving said motor, said gear and said output member;

a sensor for detecting a rotation angle of said output member;

a control circuit board formed with a processing circuit having a signal processing function of said sensor; and a board case on which said circuit board is mounted;

wherein said gear is enclosed by said gear case and said board case; and wherein a worm gear is included in the constitutional elements of said gear, and the rotating shaft of said output member and the rotating shaft of said motor are positioned vertically each other.

27. A shift controller to change a driving condition of a vehicle, comprising:

an output member for applying an operating force to a device for switching a drive force transmission channel to wheels of a motor vehicle;

a motor for generating the drive force for rotating said output member;

a gear for transmitting the drive force of said motor to said output member;

a gear case in which said motor, said gear and said output member are received;

a sensor for detecting a rotation angle of said output member; and a control circuit board including the control circuit of said motor;

wherein there is provided a construction in which a plurality of gears are connectedly meshed with one another through a gear holder.

28. A shift controller to change a driving condition of a vehicle, comprising:

an output member for applying an operating force to a device for switching a drive force transmission channel to wheels of a motor vehicle;

a motor for generating the drive force for rotating said output member;

a gear for transmitting the drive force of said motor to said output member;

a gear case receiving said motor, said gear and said output member;

a sensor for detecting a rotation angle of said output member; and a control circuit board including the control circuit of said motor;

wherein a terminal of said motor is connected to a terminal of said control circuit board by fitting connection.

29. A shift controller to change a driving condition of a vehicle, comprising:

an output member for applying an operating force to a device for switching a drive force transmission channel to wheels of a motor vehicle;

a motor for generating the drive force for rotating said output member;

a gear for transmitting the drive force of said motor to said output member;

a gear case receiving said motor, said gear and said output member;

a sensor for detecting a rotation angle of said output member; and a control circuit board including the control circuit of said motor;

wherein a board case for receiving said control circuit board or a cover joined to said board case is provided with a ventilation hole.

30. A non-contact magnetometric rotation angle sensor, comprising:

a magnet mounted on a rotational body;

an MR element positioned within a magnetism distribution space of said magnet and reactive in the direction of magnetic field; and a signal processing circuit board having a processing circuit for approximating an output signal of said MR element for each specific region with respect to a rotation angle of said rotational body with a multi function, uniting divided regions and outputting a signal linearized over 360 degrees.

31. The non-contact magnetometric rotation angle sensor, wherein said MR element is a GMR element which is reactive in the direction of magnetic field.

32. The non-contact magnetometric rotation angle sensor, wherein said multi function is calculated by calibration.

33. The non-contact magnetometric rotation angle sensor, further comprising a holding plate which is non-magnetic body for holding said signal processing circuit board.

34. The non-contact magnetometric rotation angle sensor, wherein a yoke member made of magnetic steel is arranged at a position in contact with said magnet and at a position opposite to said sensor element.

35. The non-contact magnetometric rotation angle sensor, wherein there is provided a function in which said sensor element output and an output of a temperature sensor arranged on said signal processing circuit board are processed by said signal processing circuit, and said sensor element output is compensated for the temperature characteristic thereof.

36. The non-contact magnetometric rotation angle sensor, wherein said rotational body and said sensor element are isolated by a non-magnetic body.

What is claimed is:

1. A module to change a driving condition of a vehicle, comprising:
    a motor for driving a shift rail of a transfer case;
    a control circuit of said motor; and
    a gear mechanism for transmitting rotation of said motor to said shift rail;
    wherein said gear mechanism is enclosed by a cover on which said control circuit is attached externally, and
    said gear mechanism and said control circuit are isolated by a partitioning wall respectively provided thereon.

2. A module to change a driving condition of a vehicle, comprising:
    a shift rail of a transfer case driven by a motor;
    a gear mechanism for transmitting rotation of said motor to said shift rail; and
    a non-contact type magnetometric sensor for detecting a rotating position of said shift rail;
    wherein said magnetometric sensor includes a magnet rotated together with said shift rail, and a GMR element for measuring the magnetic field which changes according to the rotating position of said magnet,
    said GMR element is mounted at a position facing to said magnet, externally of a cover for covering said gear mechanism, and
    said gear mechanism and said GMR element are isolated by a partitioning wall respectively provided thereon.

3. The module to change a driving condition of a vehicle according to claim 2, wherein said cover also serves as a board on which said control circuit is mounted, and said GMR element is mounted on said board together with said control circuit.

4. The module to change a driving condition of a vehicle according to claim 2, wherein said magnetometric sensor detects a rotating position of 360 degrees of said shift rail.

5. A module to change a driving condition of a vehicle, comprising:
    a motor for driving a shift rail of a transfer case;
    a gear mechanism for transmitting rotation of said motor to said shift rail;
    a metal case for receiving said motor and said gear mechanism; and
    a resin cover for enclosing said motor and said gear mechanism covered by said metal case, wherein a control circuit board for driving said motor is externally attached to said resin cover, and said motor is electrically connected to said control circuit by electric wiring which extends through said resin cover.

6. A module to change a driving condition of a vehicle comprising:
    a receiving casing for receiving a motor for drivingly rotating a shift rail of a transfer case and a gear mechanism for transmitting rotation of said motor to said shift rail;
    a control circuit of said motor attached on the outer circumference of said receiving casing; and
    a cover member for defining a closed space for receiving said control circuit;
    wherein said closed space is communicated with open air through a drain hole or a ventilation hole.

7. The module to change a driving condition of a vehicle according to claim 6, wherein said drain hole or said ventilation hole is provided on a ground side with said receiving casing mounted on the motor vehicle.

* * * * *